United States Patent
Sautron

(10) Patent No.: US 10,036,822 B2
(45) Date of Patent: Jul. 31, 2018

(54) DEVICE FOR PRODUCING AN ACOUSTIC SIGNAL IN A LIQUID MEDIUM, EQUIPPED WITH HYDRAULIC MEANS FOR CONTROLLING OUTPUT ACOUSTIC SIGNAL

(71) Applicant: Sercel, Carquefou (FR)

(72) Inventor: Frederic Sautron, Hyeres (FR)

(73) Assignee: Sercel, Carquefou (FR)

( * ) Notice: Subject to any disclaimer, the term of this patent is extended or adjusted under 35 U.S.C. 154(b) by 1020 days.

(21) Appl. No.: 14/328,361

(22) Filed: Jul. 10, 2014

(65) Prior Publication Data
US 2015/0016219 A1 Jan. 15, 2015

(30) Foreign Application Priority Data
Jul. 11, 2013 (EP) .................................. 13305989

(51) Int. Cl.
- *G01V 1/06* (2006.01)
- *G01V 1/38* (2006.01)
- *G01V 1/137* (2006.01)

(52) U.S. Cl.
CPC ............ *G01V 1/3861* (2013.01); *G01V 1/137* (2013.01)

(58) Field of Classification Search
USPC ........................................................ 367/144
See application file for complete search history.

(56) References Cited

U.S. PATENT DOCUMENTS

| | | | | |
|---|---|---|---|---|
| 4,108,271 A | * | 8/1978 | Chelminski | G01V 1/047 181/117 |
| 4,108,272 A | * | 8/1978 | Paitson | G01V 1/137 181/115 |
| 4,180,139 A | * | 12/1979 | Walker | G01V 1/137 181/115 |
| 4,207,962 A | * | 6/1980 | Bouyoucos | G01V 1/047 181/119 |

(Continued)

OTHER PUBLICATIONS

European Search Report and Written Opinion dated Jan. 9, 2014 for corresponding European Application No. 13305989, filed Jul. 11, 2013.

(Continued)

*Primary Examiner* — James R Hulka
(74) *Attorney, Agent, or Firm* — Ipsilon USA, LLP

(57) ABSTRACT

A device is provided for producing an acoustic signal in a liquid medium. The device includes a pneumatic chamber to contain a compressed gas volume, at least one pneumatic exhaust port allowing the compressed gas volume to be released out of the pneumatic chamber, and a shuttle movable along a translational axis during an opening phase, between two positions: a closed position in which the compressed gas volume is enclosed within the pneumatic chamber, and an open position in which the compressed gas volume is released out of the pneumatic chamber through the pneumatic exhaust port, to produce the acoustic signal in the liquid medium. A hydraulic brake is used to brake the shuttle during the opening phase. The hydraulic brake includes a hydraulic chamber and having a hydraulic exhaust area of a hydraulic volume out of the hydraulic chamber, and includes a control for controlling the acoustic signal.

18 Claims, 15 Drawing Sheets

(56) References Cited

U.S. PATENT DOCUMENTS

| | | | |
|---|---|---|---|
| 4,211,300 A * | 7/1980 | Miller | G01V 1/137 181/120 |
| 4,219,097 A * | 8/1980 | Harrison | G01V 1/137 181/115 |
| 4,234,052 A * | 11/1980 | Chelminski | G01V 1/137 181/111 |
| 4,271,924 A | 6/1981 | Cheiminiski | |
| 4,303,141 A * | 12/1981 | Pascouet | G01V 1/133 181/115 |
| 4,364,446 A * | 12/1982 | Thomas | G01V 1/137 181/113 |
| 4,381,044 A | 4/1983 | Kirby | |
| 4,472,794 A * | 9/1984 | Chelminski | G01V 1/137 181/118 |
| 4,556,120 A | 12/1985 | Kirby | |
| 4,594,697 A * | 6/1986 | Pascouet | G01V 1/133 124/71 |
| 4,603,409 A * | 7/1986 | Jaworski | G01V 1/133 181/120 |
| 4,632,214 A * | 12/1986 | Bouyoucos | G01V 1/133 181/110 |
| 4,712,202 A * | 12/1987 | Chelminski | G01V 1/137 181/118 |
| 4,733,382 A * | 3/1988 | Pascouet | G01V 1/133 124/71 |
| 4,779,245 A | 10/1988 | Cheiminski | |
| 5,128,908 A * | 7/1992 | Reust | G01V 1/155 137/625.64 |
| 5,592,439 A * | 1/1997 | Harrison | G01V 1/137 181/115 |
| 7,321,527 B2 | 1/2008 | Hopperstad et al. | |
| 2006/0050614 A1* | 3/2006 | Hopperstad | G01V 1/137 367/144 |
| 2006/0225948 A1* | 10/2006 | Guion | G01V 1/133 181/107 |
| 2007/0036032 A1* | 2/2007 | Guion | G01V 1/137 367/144 |
| 2007/0115756 A1* | 5/2007 | Guion | G01V 1/137 367/144 |
| 2007/0140059 A1* | 6/2007 | Guion | G01V 1/133 367/144 |
| 2011/0139537 A1* | 6/2011 | Greig | G01V 1/147 181/121 |
| 2011/0149681 A1* | 6/2011 | Hovland | G01V 1/3861 367/15 |

OTHER PUBLICATIONS

French Office Action dated Jan. 1, 2018.

* cited by examiner

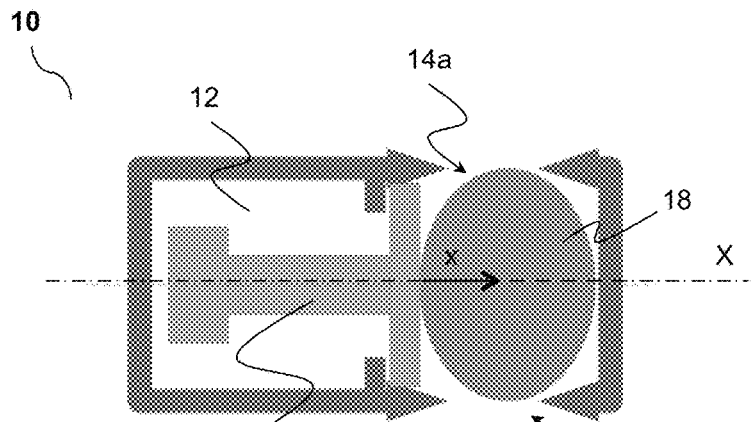
Fig. 1A
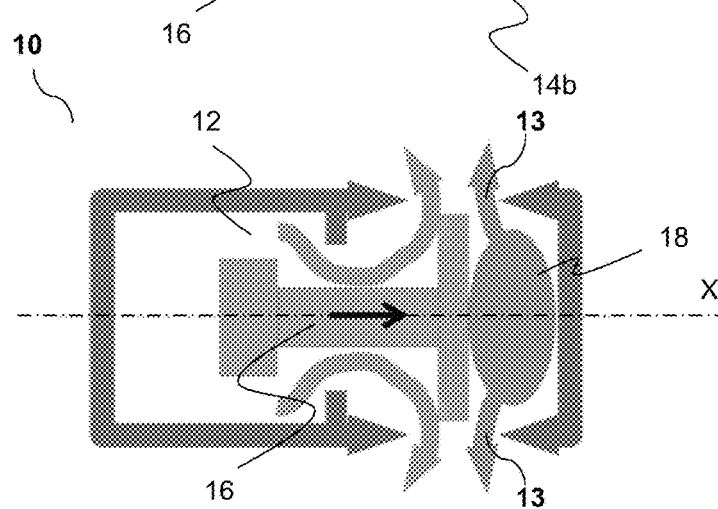
Fig. 1B
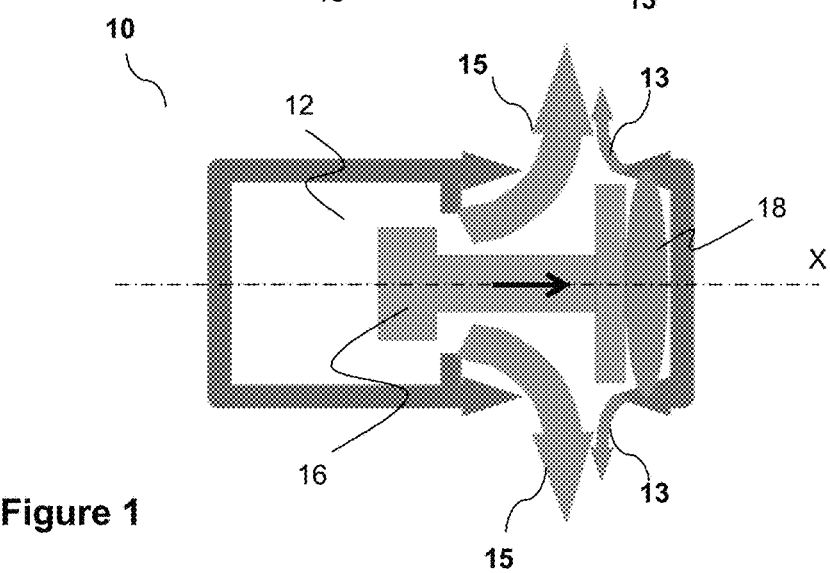
Fig. 1C
Figure 1

DEVICE FOR PRODUCING AN ACOUSTIC SIGNAL IN A LIQUID MEDIUM, EQUIPPED WITH HYDRAULIC MEANS FOR CONTROLLING OUTPUT ACOUSTIC SIGNAL

1. FIELD OF THE INVENTION

The field of the invention is that of acoustic wave sources. More specifically, the invention relates to a device for generating, by gas-release, acoustic waves in a liquid medium, also known as airgun.

Airguns are frequently used as seismic sources in marine seismic exploration to study the sea bed and its sediment layers properties.

The proposed invention can be applied to any kind of airgun marine sources.

The invention can be applied notably to the oil prospecting industry using seismic sources in a marine environment, but can be of interest for any other field which requires a device for generating acoustic waves in a liquid medium (like earthquake monitoring, fish farms protecting, water pipes cleaning industry or ship shock testing for example).

2. TECHNOLOGICAL BACKGROUND

It is sought more particularly here below in this document to describe problems existing in the field of marine seismic exploration. The invention of course is not limited to this particular field of application but is of interest for any technique that has to cope with closely related or similar issues and problems.

The operations of acquiring seismic data on site conventionally use networks of sensors (also designated as "hydrophones") distributed along cables in order to form linear acoustic antennas (also called "seismic streamers") towed by a seismic vessel. To collect geophysical data in a marine environment, submerged air guns (also called seismic sources), or more generally acoustic transmitters meant to generate a radiated acoustic pressure pulse under water, are used to gather geophysical information relating to the substrata located offshore. During marine seismic surveys, several air guns are towed behind a marine vessel. The shock wave generated by the air guns propagates into the ground where they are refracted and reflected back to the top. Antennas composed by sensors are used to log the returning wave and to convert and transmit these signals. When processed, this data will help to characterize the geophysical structure of the substrata. For a deep-water survey, several guns are deployed underneath a floatation device, within an arrangement previously calculated and simulated in order to build an overall expected acoustic pressure pulse. All air guns are activated simultaneously or not.

Generation of an acoustic signal in water by the airgun is based on a compressed gas release mechanism explained below with reference to FIG. 1.

An airgun 10 typically comprises a pneumatic chamber (also hereafter called "firing chamber") 12 intended to contain a compressed gas volume that can be released to the water through exhaust ports, for example two pneumatic exhaust ports 14a and 14b communicating with the surrounding water. The pneumatic exhaust ports 14a and 14b are holes through which the gas volume (also designated as "pneumatic volume" or "firing volume") is released from the firing chamber 12 into the surrounding water to create a bubble. Arrows 15 represent the gas volume thus released from the firing chamber 12. The bubble creates an acoustic pressure wave, also hereafter called acoustic signal. To that end, the airgun 10 comprises a movable shuttle 16 which can be moved between two extreme positions along its translational axis X, namely:

a closed position (FIG. 1A) in which the compressed gas volume is enclosed within the firing chamber 12, an open position (FIG. 1C) in which the compressed gas volume is released out of the firing chamber 12 through the pneumatic exhaust ports 14a and 14b, to generate the bubble, which then creates the acoustic signal in the surrounding water.

FIG. 1B shows the airgun 10 in an intermediate configuration in which the movable shuttle 16 is a half-open position. The airgun 10 is being opening.

Usually, the airgun 10 further comprises a hydraulic chamber 18, located ahead of the shuttle 16 in closed position, containing a liquid volume that ensures the brake of the movable shuttle 16 during the opening phase. The hydraulic chamber 18 directly communicates with the exhaust ports 14a and 14b.

The phase during which the shuttle 16 moves between the closed and open positions is commonly referred to as "opening phase" or "firing phase" of the airgun. During this opening phase, the shuttle 16 acquires a high velocity before uncovering the exhaust ports 14a and 14b. High compressed gas volume 15 is then released into the surrounding water to create a bubble that generates the acoustic signal. In parallel, a part of the liquid volume from the hydraulic chamber 18 is also released through the exhaust ports 14a and 14b (represented by arrows referenced 13). The shuttle opening mechanism is triggered by actuating a solenoid valve (referenced 11 in FIGS. 2A and 2B).

Once the firing phase completed, the firing chamber 12 being no longer under pressure, the shuttle 16 returns into its closed position to seal the firing chamber 12. The firing chamber 12 is then filled up to the required pressure with compressed gas by means of a return chamber (referenced 19 in FIGS. 2A and 2B), before launching again the opening phase of the shuttle 16.

At the rear of the airgun, it is common to find embedded electronics and various sensors.

A well-known problem of the prior art airguns is the control of output acoustic signals. Indeed, it is important to be able to control accurately shape of acoustic signal generated by the airgun as function of expected needs.

The patent document U.S. Pat. No. 7,321,527 proposes an airgun whose output acoustic signal is controlled by means of an adjustment of the pneumatic structural features, with the aim of reducing high frequency range of acoustic signals. High frequency signals are generally considered unwanted signals (i.e. noise) as they are outside of the frequency range usually used in marine seismic exploration. In addition, they generate underwater noise pollution that they may disrupt the marine wildlife. In order to meet this need, it is proposed in that document to configure The pneumatic chamber and/or pneumatic exhaust ports to adjust the gas rate released into water during the opening phase of the shuttle, so as to create a pneumatic exhaust area at a non-linear rate. The amplitude of the unwanted seismic frequencies emitted in water can be then reduced by adjusting the slope of the radiated acoustic pressure, A drawback of this known solution is that the range of modulation of acoustic signal is relatively limited. It further requires an accurate adjustment of the pneumatic structural features of the airgun, especially since the pneumatic forces that participate to the acoustic signal creation are not easily controllable.

In addition, this known technique provides a static solution and the output acoustic signal cannot be remotely tuned, for example from a control unit placed on the seismic vessel, which is not optimal.

3. SUMMARY OF THE INVENTION

A particular embodiment of the invention proposes a device for producing an acoustic signal in a liquid medium, comprising:
- a pneumatic chamber intended to contain a compressed gas volume,
- at least one pneumatic exhaust port allowing the compressed gas volume to be released out of the pneumatic chamber,
- a shuttle able to be moved along a translational axis during an opening phase, between two positions:
  - a closed position in which the compressed gas volume is enclosed within the pneumatic chamber,
  - an open position in which the compressed gas volume is released out of the pneumatic chamber through said at least one pneumatic exhaust port, to produce the acoustic signal in the liquid medium,
- hydraulic means intended to brake the shuttle during said opening phase, said hydraulic means comprising a hydraulic chamber and having an hydraulic exhaust area of a hydraulic volume out of the hydraulic chamber, said hydraulic means comprising means for controlling the acoustic signal.

Thus, the invention relies on a wholly novel and inventive approach consisting of a particular design of hydraulic means configured to act on the acoustic signal. The controlling means, which are comprised within the hydraulic means, can be either passive controlling means (which result from structural features) or active (or dynamic) controlling means.

According to a particularly advantageous feature, said means for controlling the acoustic signal themselves comprise means for adapting said hydraulic exhaust area.

The invention thus provides a device whose output acoustic signal is controlled by adapting the hydraulic exhaust area of the hydraulic means already present to ensure braking for the shuttle during the open phase thereof. The inventors discovered that, by exploiting hydraulic forces acting on the shuttle to modify the dynamic of movement of the shuttle during its opening phase, it is possible to control much more efficiently the output acoustic signal than for the prior art devices, which only take advantage of pneumatic forces. Indeed, hydraulic fluids being very less compressible than pneumatic fluids, the output acoustic signal can be more accurately tuned.

A hydraulic control of the output signal therefore allows a greater capacity of modulation of acoustic signal than the prior art airgun.

According to a particular implementation, said means for controlling the acoustic signal comprise at least one hydraulic exhaust port which is not confounded with said at least one pneumatic exhaust port.

According to a first exemplary embodiment (of the particular implementation), said means for controlling the acoustic signal comprise at least one hydraulic exhaust port communicating with said hydraulic chamber that does not communicate with said at least one pneumatic exhaust port.

According to a second exemplary embodiment (of the particular implementation), said means for controlling the acoustic signal comprise at least one hydraulic exhaust port communicating with at least one secondary hydraulic chamber that does not communicate with said hydraulic chamber nor with said at least one pneumatic exhaust port.

Advantageously, said means for controlling the acoustic signal comprise means for driving the hydraulic volume releasing out of said at least one hydraulic exhaust port, during said opening phase.

This feature makes possible a dynamic (or active) control of the hydraulic volume discharged out of said at least one hydraulic chamber and thus choose the form of non-linear behaviour of the hydraulic exhaust area in order to tune the output acoustic signal as needed. One may envisage that the hydraulic volume releasing control means can be remotely tuned, for example, from a control unit placed on the seismic vessel. The invention thus provides the ability of driving in a dynamic and remotely way the output acoustic signal.

Said means for driving the hydraulic volume advantageously comprise a tune valve.

According to a third exemplary embodiment, said means for controlling the acoustic signal comprise at least one secondary hydraulic chamber communicating with said hydraulic chamber itself communicating with said at least one pneumatic exhaust port.

According to a fourth exemplary embodiment, said means for controlling the acoustic signal comprise a shuttle head comprising at least one through aperture, said hydraulic chamber communicating with said at least one through aperture itself communicating with said at least one pneumatic exhaust port.

According to a fifth exemplary embodiment, said means for controlling the acoustic signal comprise a shuttle head having a non-constant cross-sectional shape along the translational axis.

Those five exemplary embodiments described above can be used separately of in combination.

According to a particular feature, said at least one hydraulic exhaust port and the shuttle are arranged for forming a constant hydraulic exhaust area as a function of the shuttle position (x) along its translational axis, during said opening phase.

For example, the device comprises a hydraulic exhaust port of constant cross-section shape.

According to another particular feature, said at least one hydraulic exhaust port and the shuttle are arranged for forming a non-constant and non-linear hydraulic exhaust area as a function of the shuttle position (x) along its translational axis, during said opening phase.

For example, the device comprises a hydraulic exhaust port having a conical cross-section shape along the translational axis, so that the aperture (or hydraulic transfer surface) created by the displacement of the shuttle in relation to the hydraulic exhaust port is non-linear as a function of the shuttle position. The inventor have further highlighted that a non-constant hydraulic exhaust area may allow a more accurate tuning of the output signal.

According to another particular feature, said at least one first hydraulic exhaust port cooperates with means for driving the hydraulic volume releasing out of said at least one hydraulic chamber, during said opening phase.

According to another particular feature, said at least one secondary hydraulic chamber communicates with said hydraulic chamber via at least one through hole arranged within a partition wall separating said least one secondary hydraulic chamber.

According to another particular feature, said at least one secondary hydraulic chamber communicates with said hydraulic chamber via a through aperture created by the displacement of the shuttle in relation to at least one partition wall of said at least one hydraulic chamber.

According to another particular feature, said at least one secondary hydraulic chamber communicates with said hydraulic chamber via at least one through hole arranged within a shuttle head.

According to another particular feature, said shuttle head belongs to the group comprising:
- a crow-shaped shuttle head;
- a conical-shaped shuttle head;
- an ovoid-shaped shuttle head;
- a bell-shaped shuttle head.

It should be noted that this list is not exhaustive.

Another particular embodiment of the invention proposes a method for controlling an acoustic signal produced in a liquid medium by a device comprising:
- a pneumatic chamber intended to contain a compressed gas volume,
- at least one pneumatic exhaust port allowing the compressed gas volume to be released out of the pneumatic chamber,
- a shuttle able to be moved along a translational axis during an opening phase, between two positions:
  - a closed position in which the compressed gas volume is enclosed within the pneumatic chamber,
  - an open position in which the compressed gas volume is released out of the pneumatic chamber through said at least one pneumatic exhaust port, to produce the acoustic signal in the liquid medium,
- hydraulic means intended to brake the shuttle during said opening phase, said hydraulic means comprising a hydraulic chamber and having a hydraulic exhaust area of a hydraulic volume out of the hydraulic chamber, said method being such that it comprises a step of controlling the acoustic signal with said hydraulic means.

According to a particular feature, said step of controlling the acoustic signal with said hydraulic means comprises a step of driving the hydraulic volume releasing out of at least one hydraulic exhaust port, which is not confounded with said at least one pneumatic exhaust port, during said opening phase.

4. LIST OF FIGURES

Other features and advantages of embodiments of the invention shall appear from the following description, given by way of an indicative and non-exhaustive examples and from the appended drawings, of which:

FIG. 1, already described with reference to the prior art, presents an example of prior art airgun (FIGS. 1A, 1B and 1C illustrating the airgun in a closed configuration, in an intermediate configuration and in an open configuration respectively);

FIG. 2, already described with reference to the prior art, shows in greater detail the structure of the airgun of FIG. 1 (FIGS. 2A and 2B illustrating the airgun in a closed configuration and in an open configuration respectively);

Figure 2:
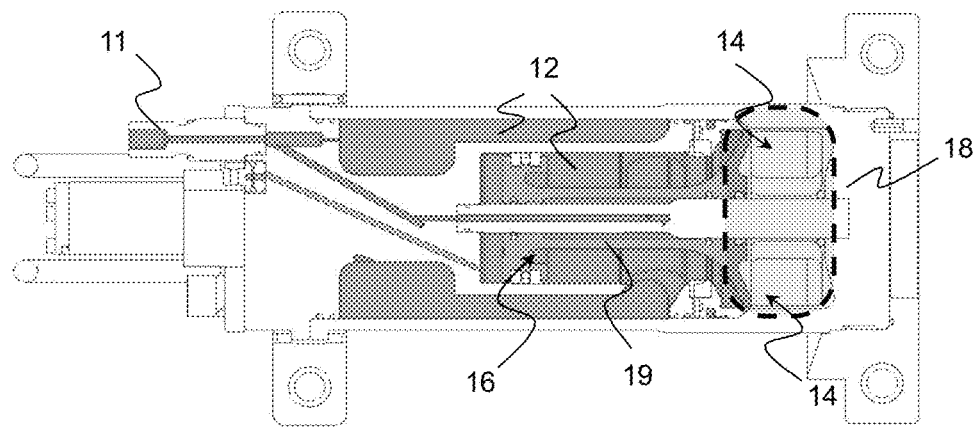
Figure 2:
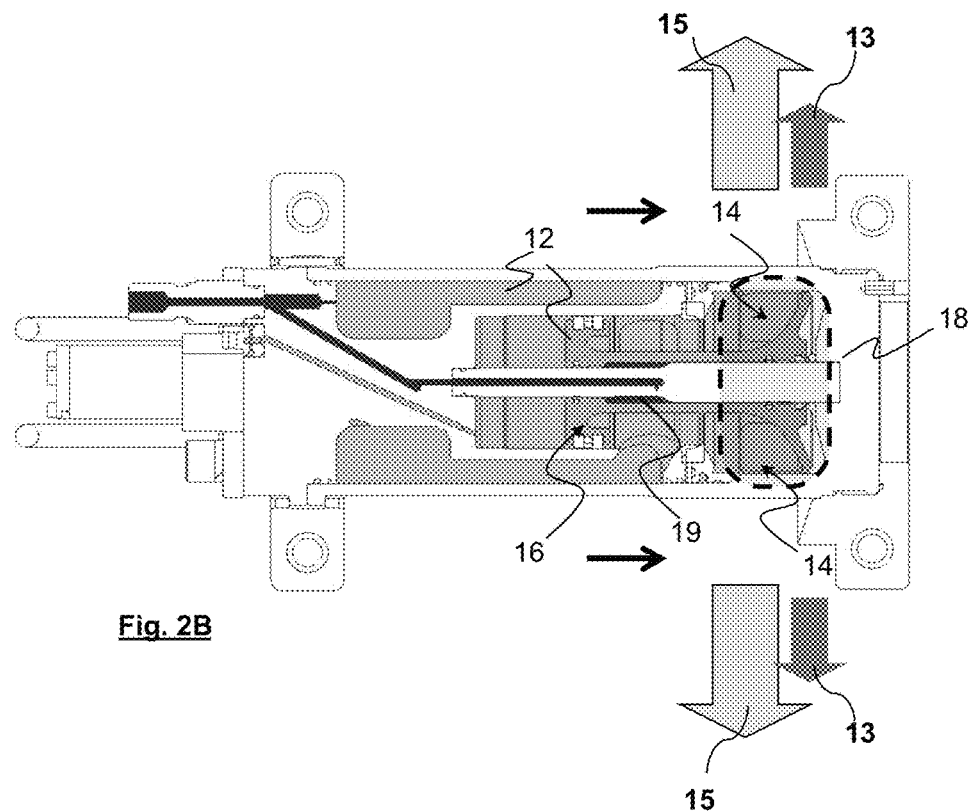
Figure 3:
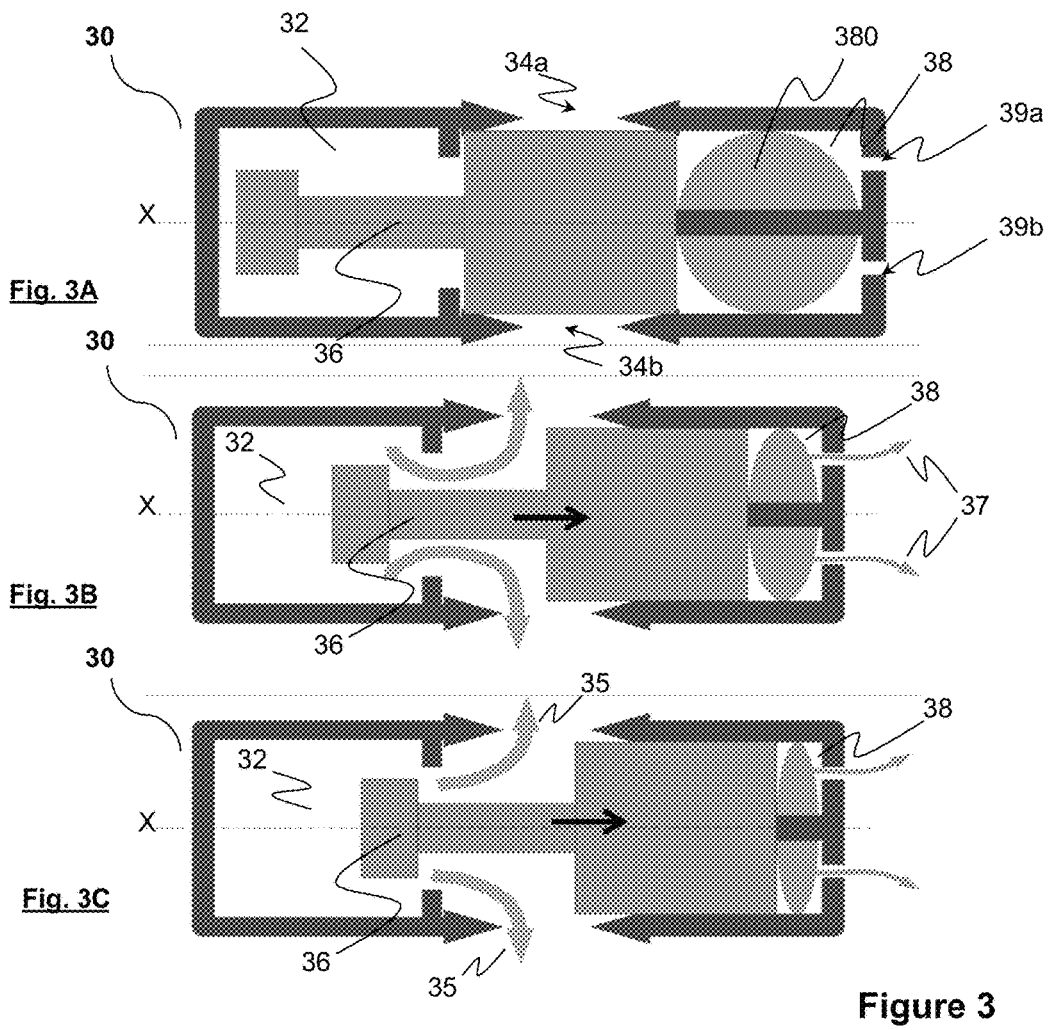
FIG. 3 is a schematic illustration of an airgun according to a first embodiment of the invention (FIGS. 3A, 3B and 3C illustrating the airgun in closed position, in half-open position and in open position respectively)
Figure 5:
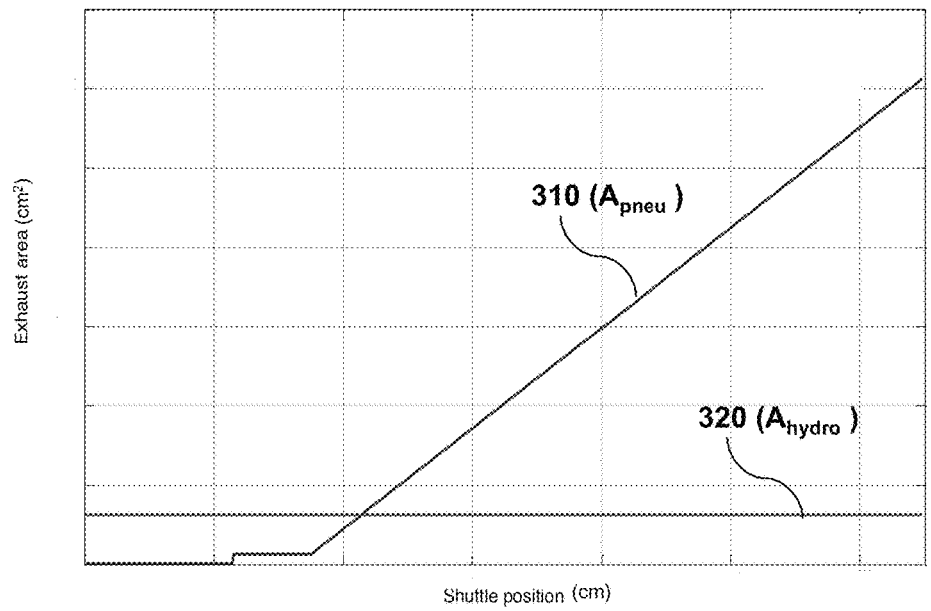
Figure 6:
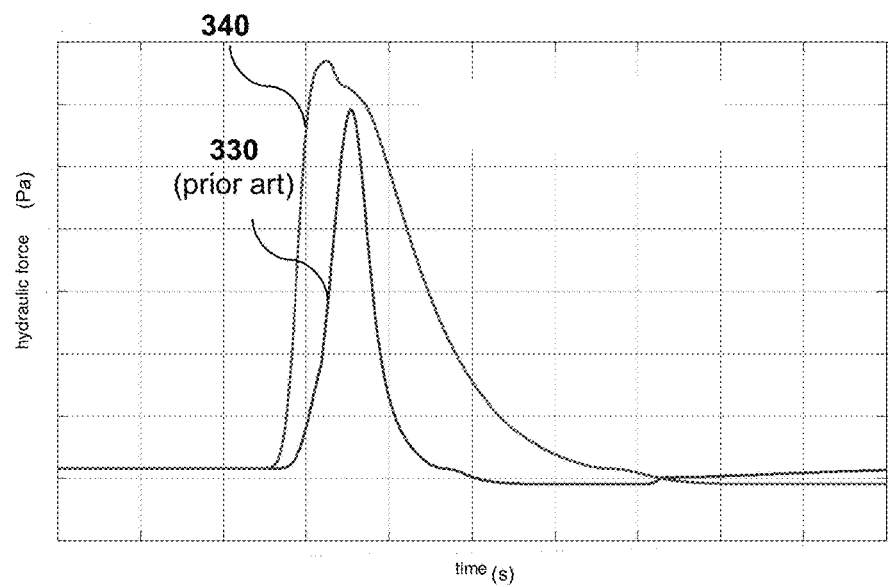
Figure 7:
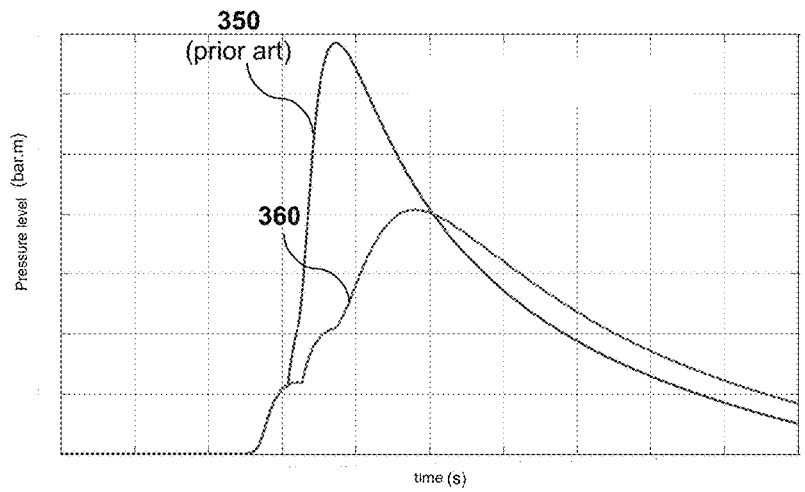
Figure 8:
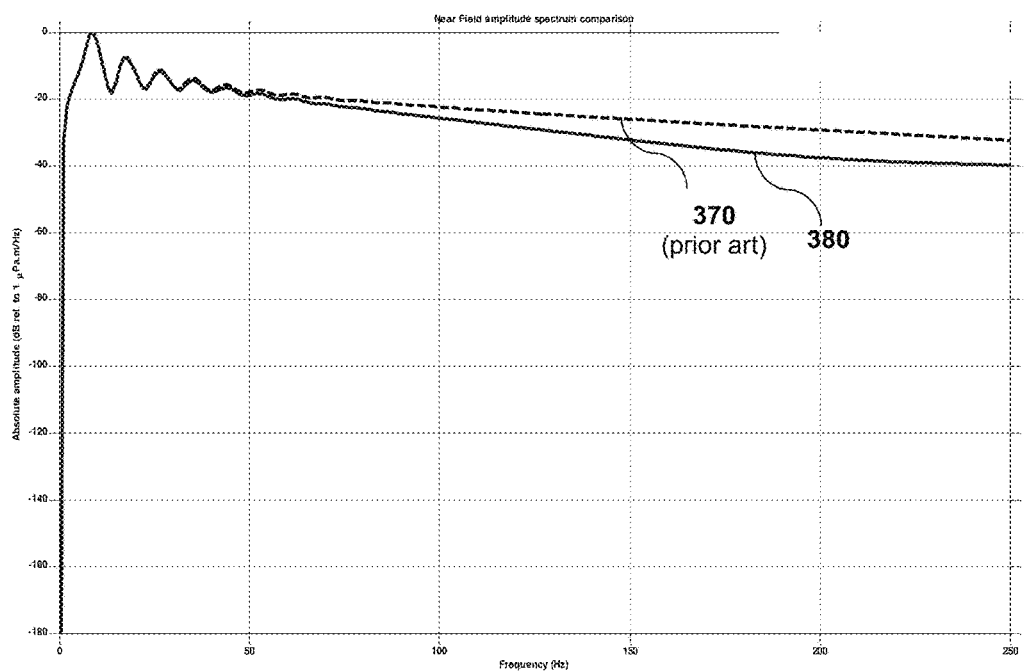
Figure 9:
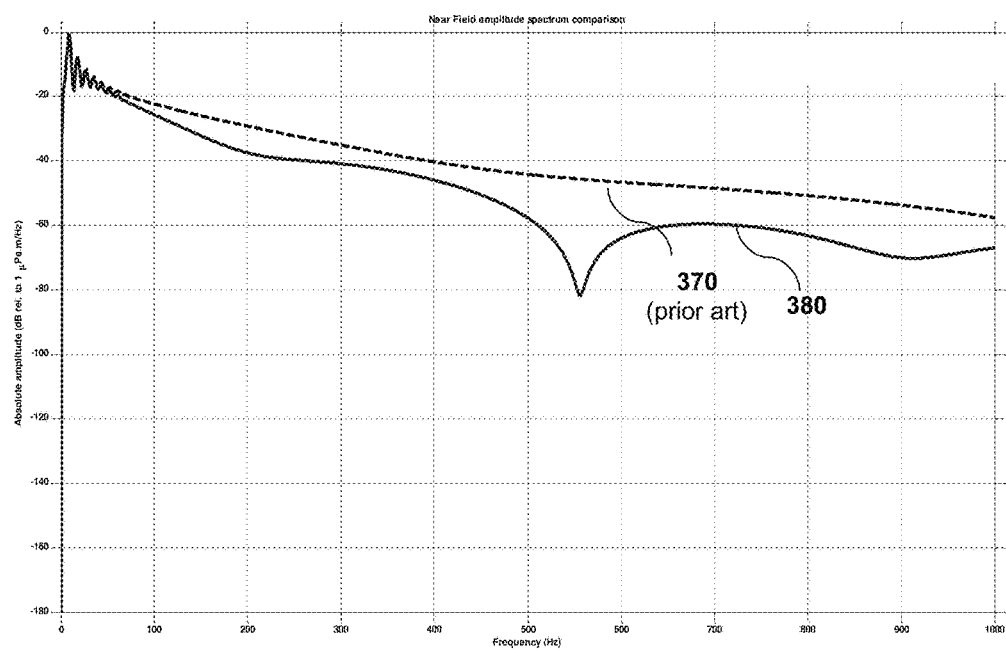
Figure 10:
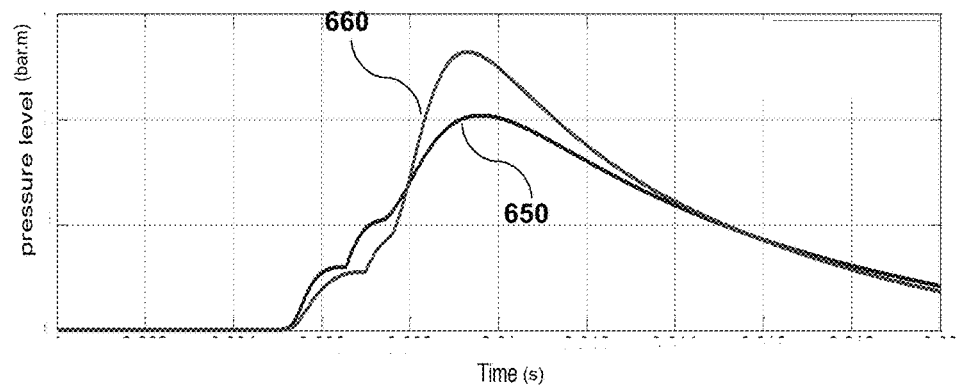
Figure 11:
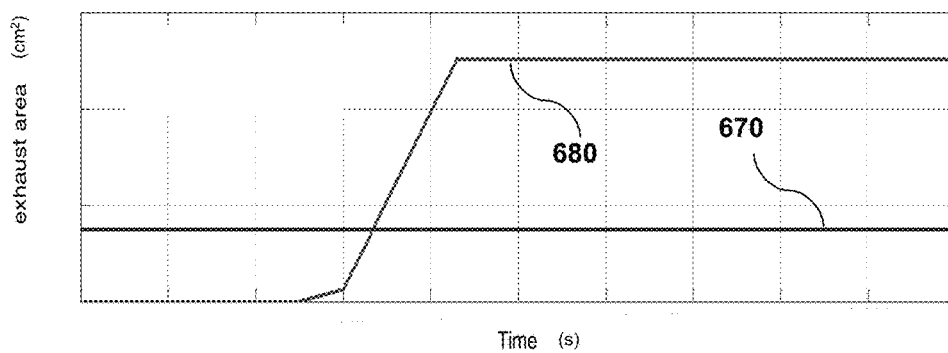
Figure 12:
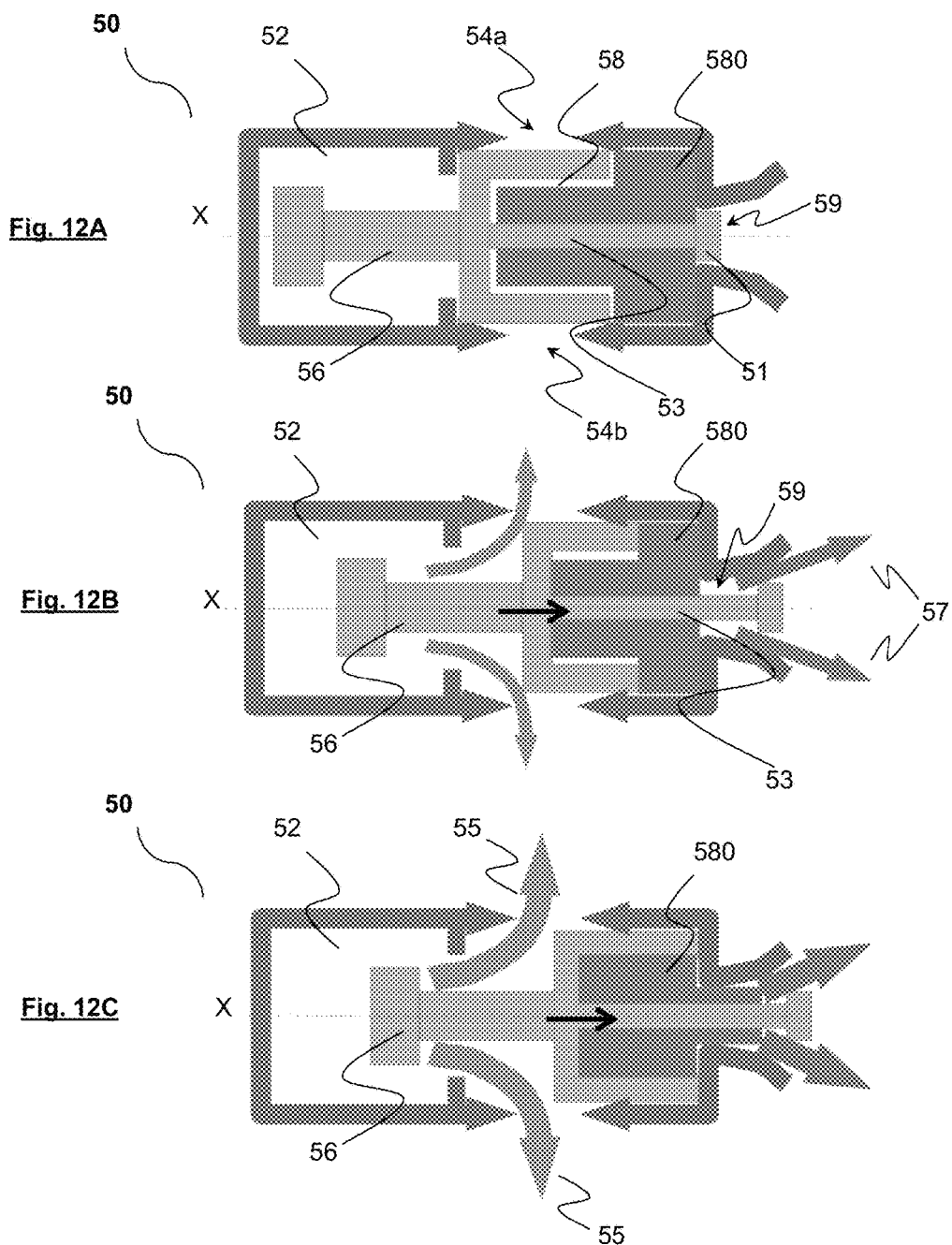
Figure 13:
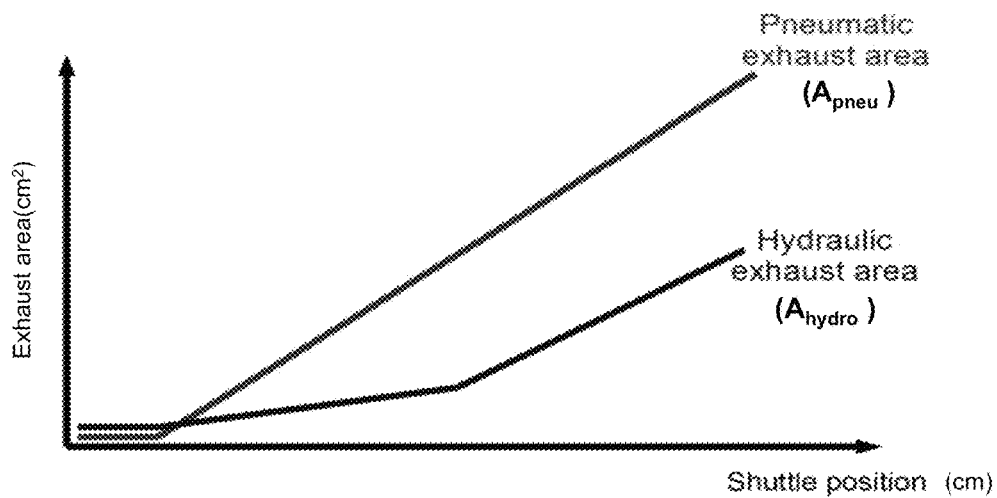
Figure 14:
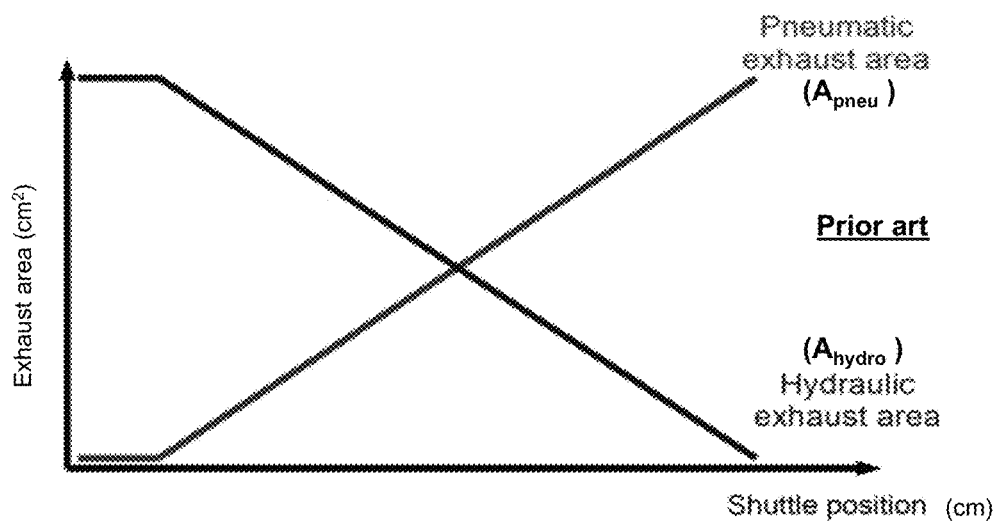
Figure 15:
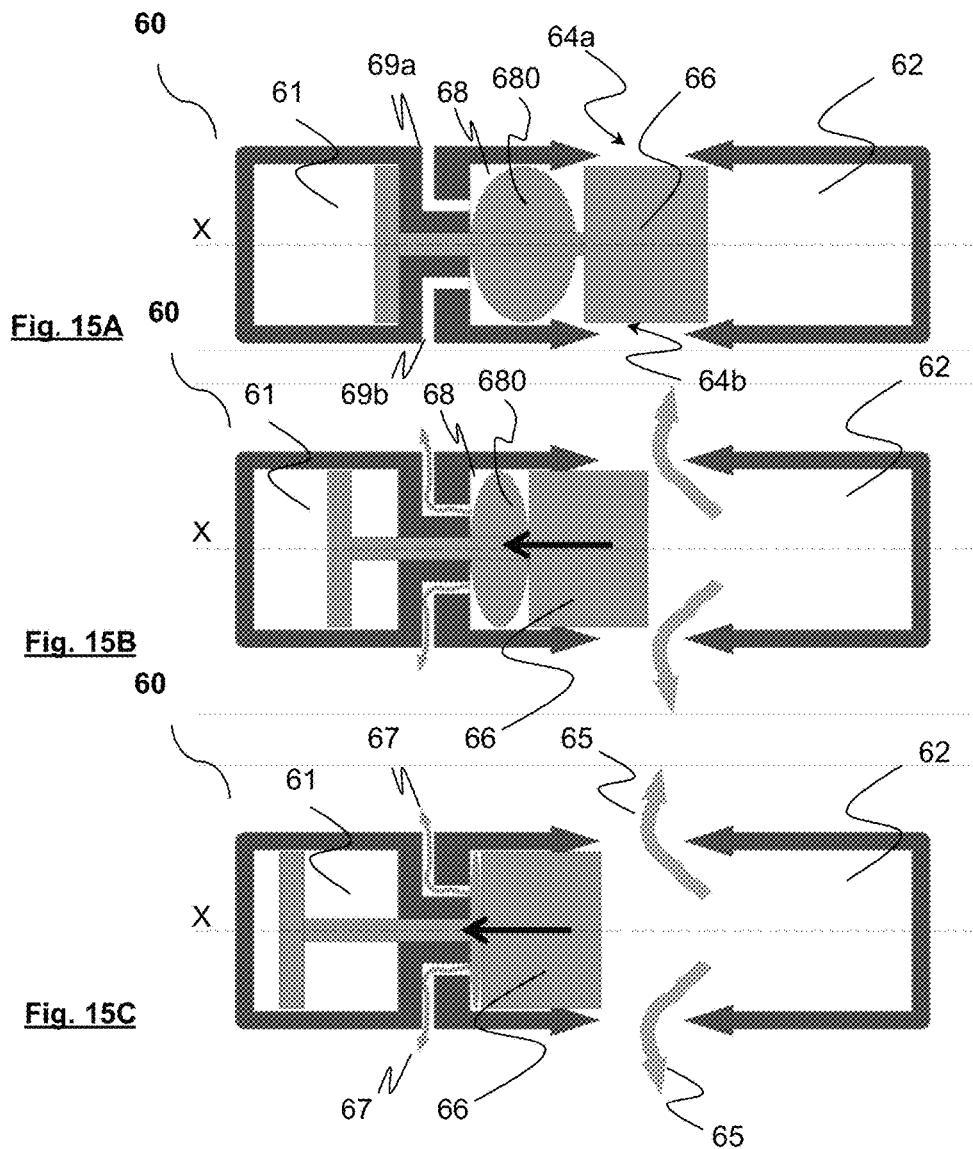
Figure 16:
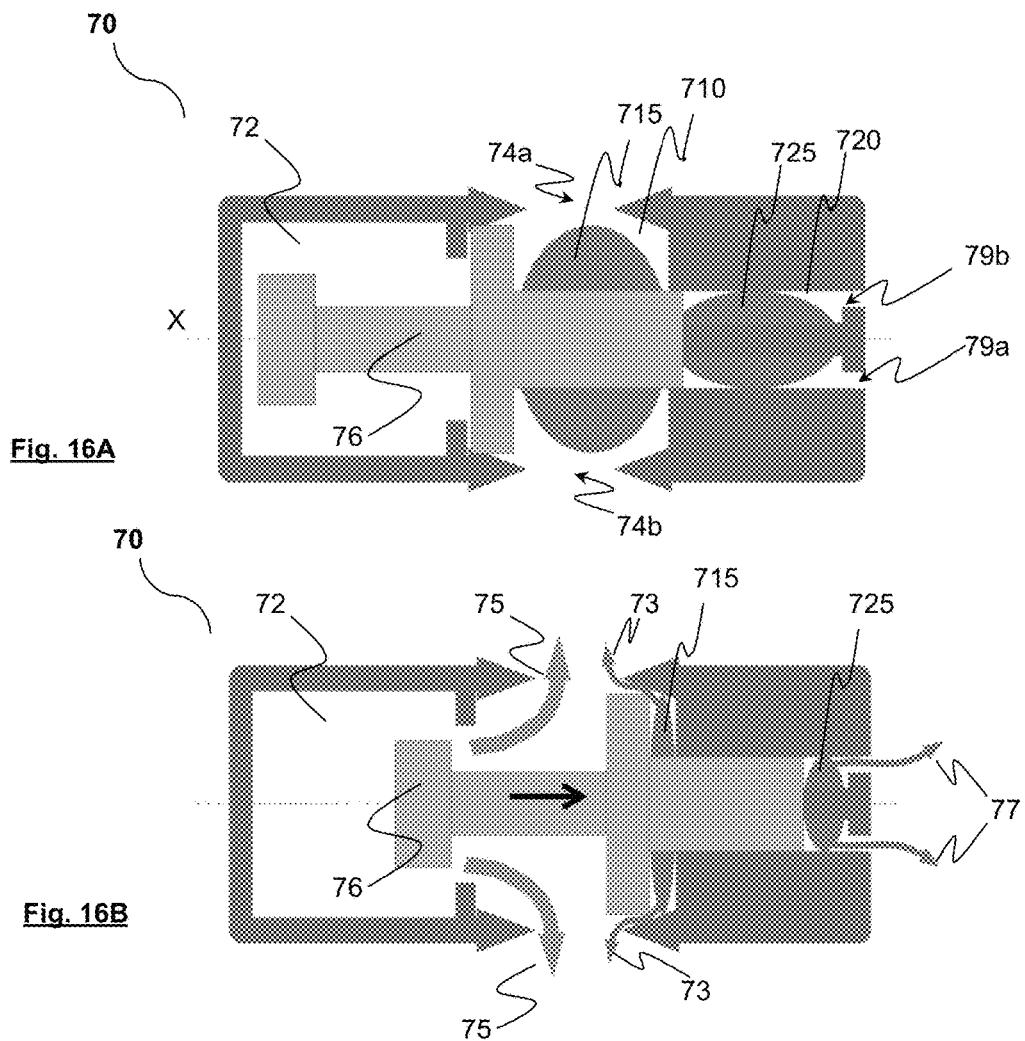
Figure 17:
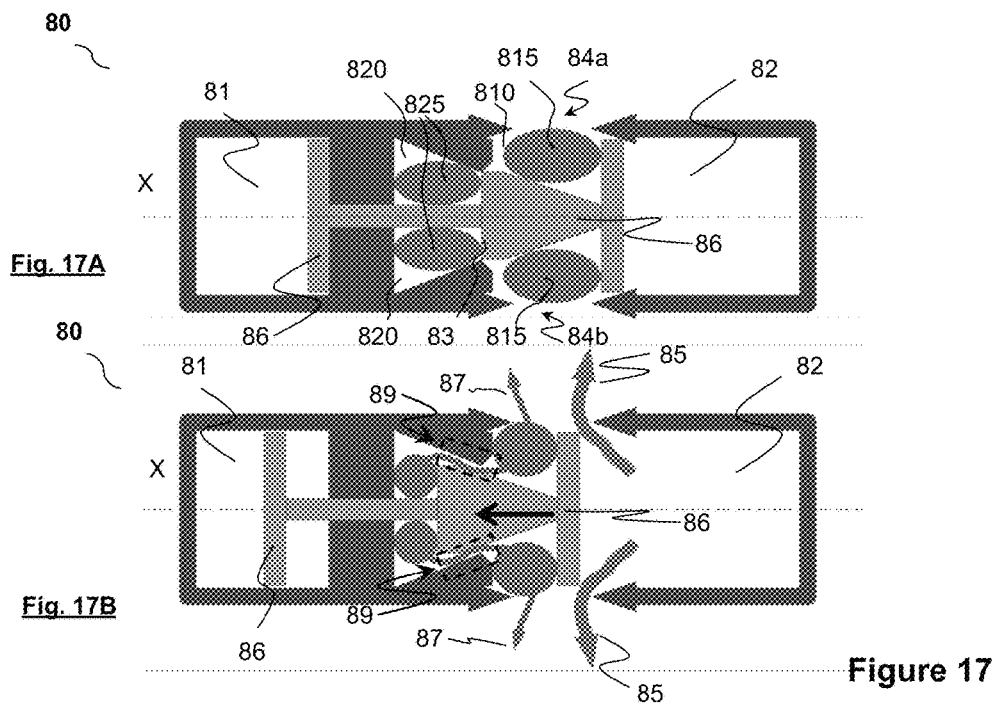
Figure 18:
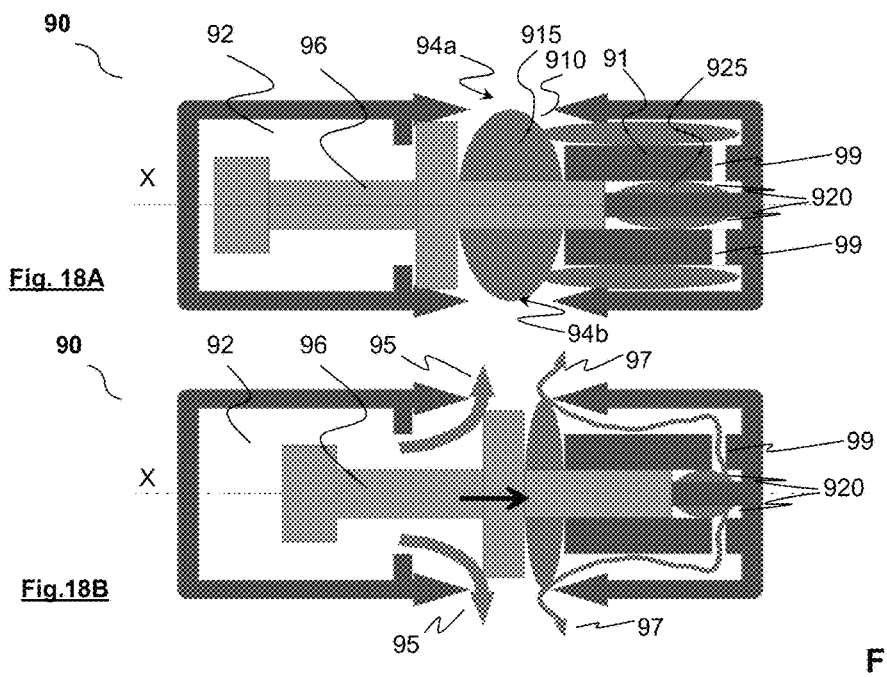
Figure 19:
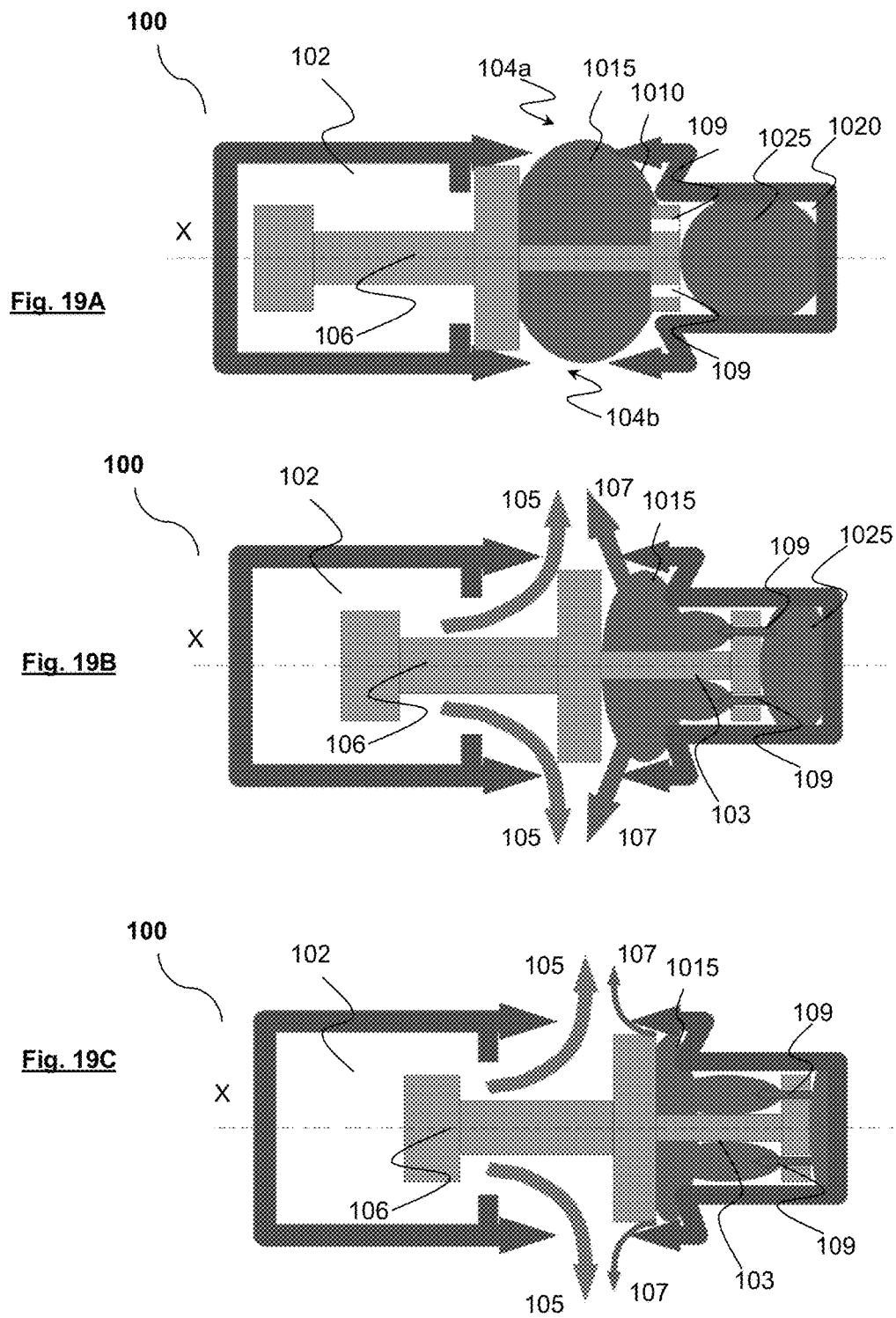
Figure 20:
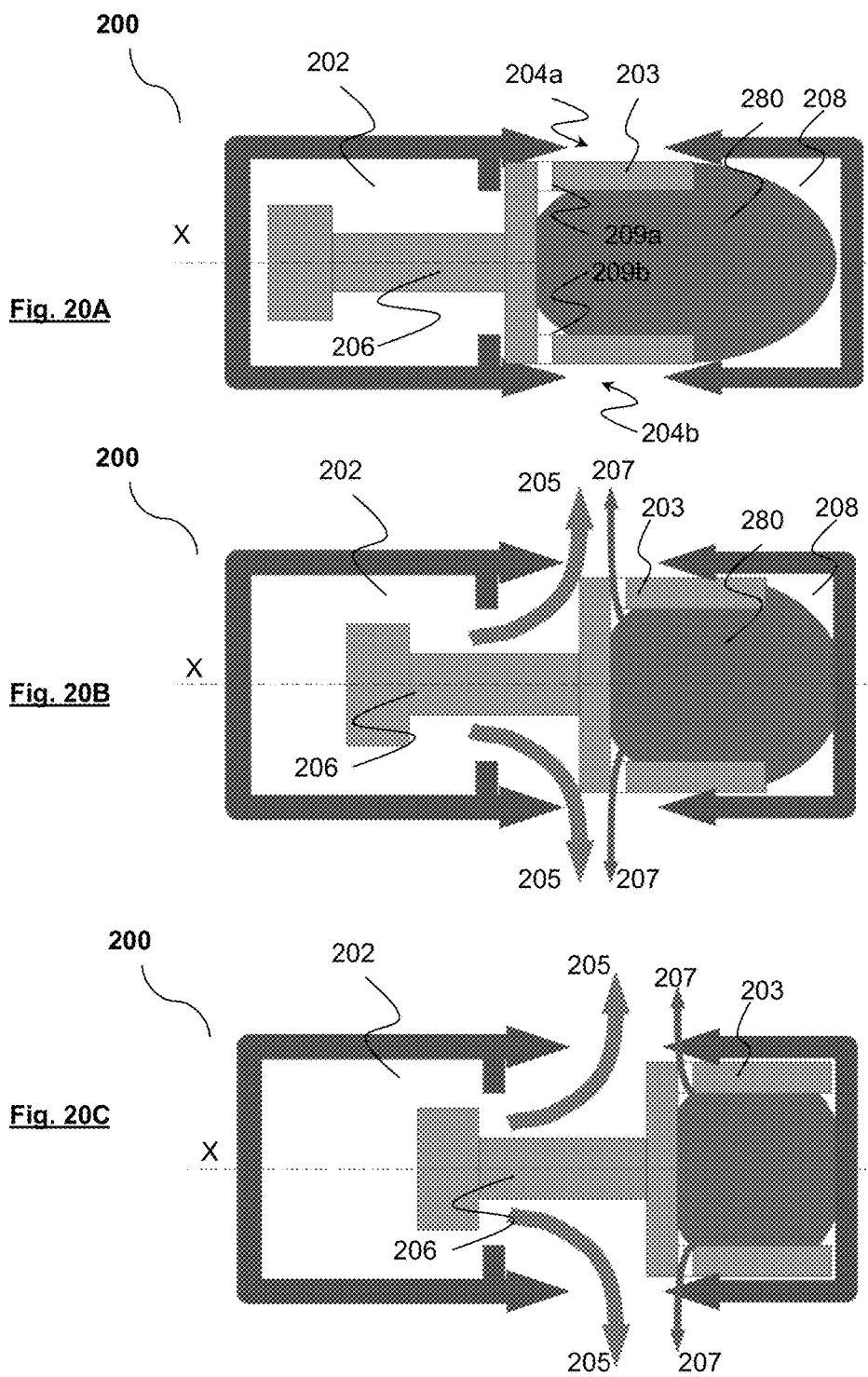
Figure 21:
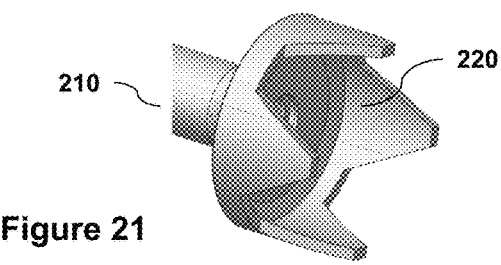
Figure 22A:
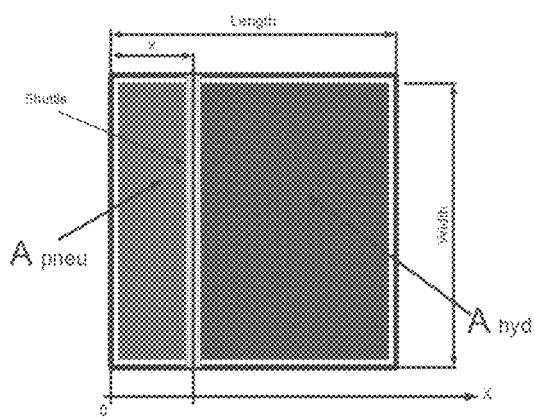
Figure 22B:
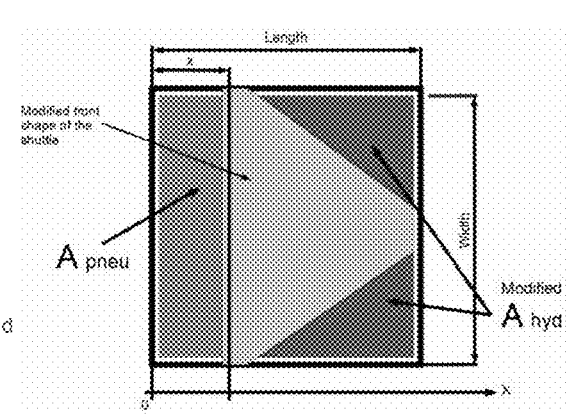
Figure 23:
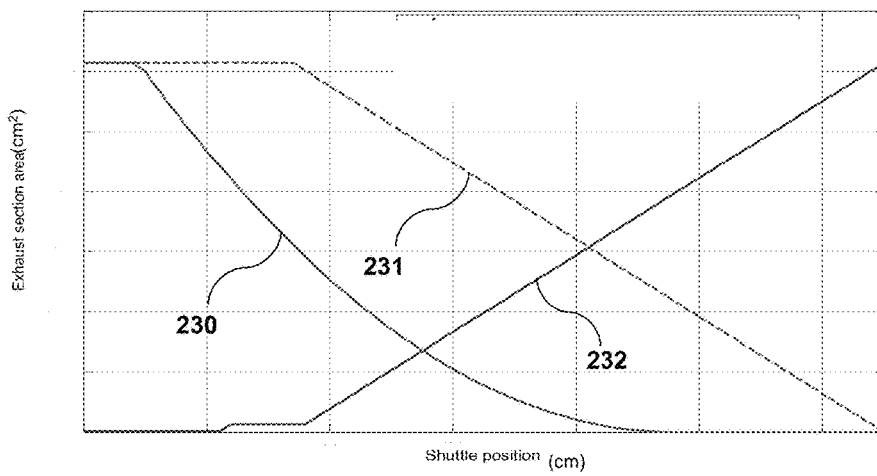

FIG. 5 graphically shows evolution of the pneumatic and hydraulic exhaust areas obtained with the airgun of FIG. 3 as a function of the shuttle position;

FIG. 6 graphically shows evolution in time of the hydraulic forces involved within the airgun of FIG. 3, compared to a prior art airgun;

FIG. 7 graphically shows evolution in time of the radiated acoustic pressure for the airgun of FIG. 3, compared to a prior art airgun;

FIGS. 8 and 9 graphically show near field amplitude spectrum of FIG. 3 compared to a prior art airgun used in same conditions, respectively for the range of 0-250 Hz and of 0-1000 Hz;

FIG. 10 graphically shows evolution in time of the radiated acoustic pressure for the airgun of FIG. 3, when the hydraulic exhausting area is controlled passively or actively;

FIG. 11 graphically shows evolution in time of the hydraulic exhausting area generated on the airgun of FIG. 3, when this one is controlled passively or actively;

FIG. 12 is a schematic illustration of an airgun according to a first variant of the first embodiment of the invention (FIGS. 12A, 12B and 12C illustrating the airgun in closed position, in half-open position and in open position respectively);

FIGS. 13 and 14 graphically shows evolution of the pneumatic and hydraulic exhaust areas obtained with the airgun of FIG. 12 and the prior art airgun of FIG. 1 respectively, as a function of the shuttle position;

FIG. 15 is a schematic illustration of an airgun according to a second variant of the first embodiment of the invention (FIGS. 15A, 15B and 15C illustrating the airgun in closed position, in half-open position and in open position respectively);

FIG. 16 is a schematic illustration of an airgun according to a second embodiment of the invention (FIGS. 16A and 16B illustrating the airgun in closed position and in open position respectively);

FIG. 17 is a schematic illustration of an airgun according to a third embodiment of the invention (FIGS. 17A and 17B illustrating the airgun in closed position and in open position respectively);

FIG. 18 is a schematic illustration of an airgun according to a first variant of the third embodiment of the invention (FIGS. 18A and 18B illustrating the airgun in closed position and in open position respectively);

FIG. 19 is a schematic illustration of an airgun according to a second variant of the third embodiment of the invention (FIGS. 19A, 19B and 19C illustrating the airgun in closed position, in half-open position and in open position, respectively);

FIG. 20 is a schematic illustration of an airgun according to a fourth embodiment of the invention (FIGS. 20A, 20B and 20C illustrating the airgun in closed position, in half-open position and in open position respectively);

FIG. 21 is a schematic illustration of a shuttle of an airgun according to a fifth embodiment of the invention;

FIGS. 22A and 22B illustrate the principle of adaptation of the hydraulic exhaust area for controlling the acoustic signal of the airgun (FIG. 22B) of FIG. 21 compared to a prior art airgun (FIG. 22A);

FIG. 23 graphically shows evolution of the pneumatic and hydraulic exhaust areas obtained on an airgun equipped with the shuttle of FIG. 21 as a function of the shuttle position, and compared to a prior art airgun.

5. DETAILED DESCRIPTION

In all of the figures of the present document, identical elements and steps are designated by the same numerical reference sign.

The general principle of an embodiment of the invention is a hydraulic control of the output acoustic signal. More particularly, an embodiment of the invention adapts the hydraulic exhaust area of a hydraulic brake, which is basically present to ensure braking of the shuttle during the opening (or the firing) phase of the airgun, to control the output acoustic signal.

In the context of experimentations carried out on the behaviour of hydraulic brakes on the functioning of the airgun, the inventors surprisingly discovered that hydraulic forces acting on the shuttle had a high impact on the dynamic of the shuttle during the firing phase, and therefore on output acoustic signal. With the assumption that hydraulic fluids being very less compressible than pneumatic fluids, hence more efficient, the inventors have developed an airgun that takes advantage of hydraulic forces acting on the shuttle in order to modify the dynamic of movement of the shuttle and thus to enable a better control of the gas volume which exhausts from the airgun.

According to an embodiment of the invention, an acoustic signal control for controlling the acoustic signal of the airgun comprises means for adapting the hydraulic exhaust area from which the principle is described in further detail below in relation with FIGS. 1 to 24.

FIG. 3 is a schematic illustration of an airgun 30 according to a first embodiment of the invention. FIGS. 3A, 3B and 3C depict the functioning of the airgun 30 during its opening phase, respectively, in closed position, in half-open position and in open position.

Figure 4:
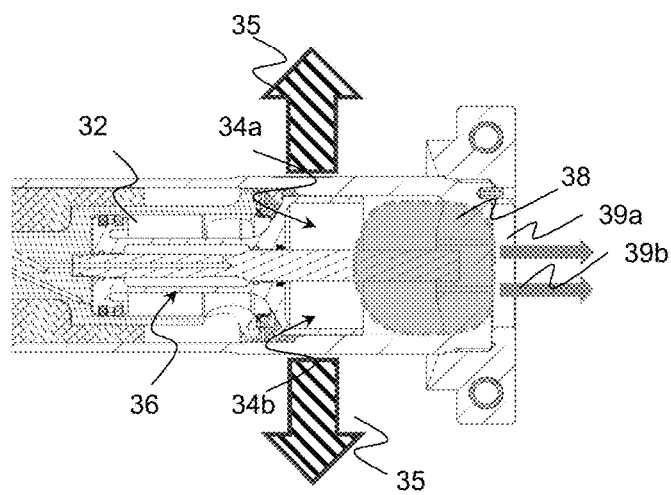
FIG. 4 shows in greater detail the structure of the airgun of FIG. 3 in the closed position.

FIG. 4 shows in greater detail the structure of the airgun 30 in the closed position.

According to this first embodiment, the airgun 30 comprises:
- a firing (or pneumatic) chamber 32 containing a compressed air volume,
- two pneumatic exhaust ports 34a and 34b allowing the compressed air volume to be released out of the firing chamber 32,
- a shuttle 36 moveably positioned along a translational axis X,
- hydraulic means intended to brake the shuttle 36, comprising a hydraulic chamber 38 and having a hydraulic exhaust area of a liquid volume 380 out of the hydraulic chamber 38, the hydraulic chamber 38 being isolated from the pneumatic exhaust ports 34a and 34b,
- two hydraulic exhaust ports 39a and 39b allowing the liquid volume 380 to be released out of the hydraulic chamber 38.

In this exemplary embodiment, means for adapting the hydraulic exhaust area are constituted by the two hydraulic exhaust ports 39a and 39b communicating with the hydraulic chamber 38 that does not communicate with the pneumatic exhaust ports 34a and 34b. The hydraulic exhaust ports 39a and 39b are here independent from the pneumatic exhaust ports 34a and 34b, and are entirely dedicated to the liquid volume exhausting. The hydraulic exhaust ports 39a and 39b are of constant cross-section along the axis X.

The shuttle 36 moves during the opening phase between two extreme positions (following the black arrow):
- a closed position (FIG. 3A) in which the compressed air volume is enclosed within the firing chamber 32,
- an open position (FIG. 3C) in which:
  the compressed air volume is released out of the firing chamber 32 through the pneumatic exhaust ports 34a and 34b (represented by arrows 35), to produce a bubble that generates an acoustic signal in the surrounding water,
  the liquid volume 380 is released out of the hydraulic chamber 38 through the hydraulic exhaust ports 39a and 39b (represented by arrows 37).

At FIG. 3B, the shuttle 36 is in half-open position: the shuttle reveals the pneumatic exhaust ports 34a and 34b and the compressed air volume begins to be released out of the firing chamber 32. In parallel, the liquid volume 380 contained in the hydraulic chamber 38 begins to be released out of the hydraulic chamber 38.

The presence of two hydraulic exhaust ports 39a and 39b communicating with the hydraulic chamber 38 that does not communicate with the pneumatic exhaust ports 34a and 34b leads to create a non-linear (constant) hydraulic exhaust area ($A_{hydro}$) as a function of the shuttle position (x) along its translational axis X, over the opening phase of the shuttle 36.

An example of profile of hydraulic exhaust area is illustrated in FIG. 5. This FIG. 5 shows evolution of the pneumatic exhaust area (curve referenced 310 ($A_{pneu}$)) and the hydraulic exhaust area (curve referenced 320 ($A_{hydro}$)) as a function of the position of the shuttle 36 of the airgun 30. The airgun 30 has a pneumatic exhaust area which changes linearly when discovering the pneumatic exhaust ports 34a and 34b, whereas the hydraulic exhaust area obtained has a constant, hence non-linear, profile.

FIG. 6 graphically shows evolution in time of the hydraulic forces involved within the airgun 30 (curve referenced 340), compared to a prior art airgun (curve referenced 330) used in same conditions. It can be noted that the sum of hydraulic forces acting on the shuttle 36 of the airgun 30 are more significant than the sum of hydraulic forces acting on the shuttle of the prior art airgun. In particular, the inventors became aware that involving hydraulic forces much earlier in the shuttle dynamic than for prior art airgun allows a greater ease of modulation of the acoustic signal, hence the interest of taking advantage of hydraulic forces involved over the opening phase.

FIG. 7 graphically shows evolution in time of the near field radiated acoustic pressure level of the airgun 30 (curve referenced 360), compared to a prior art airgun (curve referenced 350) used in same conditions. This graph shows that the output signal of the hydraulic controlled airgun 30 is significantly modified. We observe that the rising slope obtained for the airgun 30 is less steep than for the prior art airgun. A reduced slope means a reduction in high frequencies of the output acoustic signal. This shows that a hydraulic control of the shuttle dynamic enables to reduce the high frequency range much more efficiently than for prior art airguns (which are only based on a pneumatic control).

FIGS. 8 and 9 graphically show near field amplitude spectrum of the airgun 30 (curve referenced 380) compared to a prior art airgun (curve referenced 370) used in same conditions, respectively for the range of 0-250 Hz and of 0-1000 Hz. These two graphs confirm that a hydraulic control of the output signal according to an embodiment of the invention can allow a significative reduction of high frequency range.

In addition, in order to provide an active control of the hydraulic volume discharged in the surrounding water, one can envisage adding at the vicinity of the hydraulic exhaust ports 39a and 39b, means for controlling actively the hydraulic volume releasing out of the hydraulic chamber 38 during the opening phase. For example, those controlling means are consisted of a remotely-controlled tune valve (not shown), which allows to actively control the liquid volume discharged in the surrounding water over the opening phase. By actively controlling the hydraulic volume discharged, from the seismic vessel via a control unit for example, it is possible to adjust the hydraulic exhaust area ($A_{hydro}$) as a function of the desired profile, and thus modify remotely and in real time the shape of the output acoustic signal. An exemplary profile of a hydraulic exhaust area ($A_{hydro}$) actively controlled is illustrated in FIG. 11, and its impact on the near field radiated acoustic pressure level in FIG. 10.

FIG. 10 graphically shows evolution in time of the near field radiated acoustic pressure level exerted within the airgun 30, when the hydraulic exhausting area is controlled passively (curve referenced 650) or actively (curve referenced 660). FIG. 11 graphically shows evolution in time of the hydraulic exhausting area obtained with the airgun 30 when it is controlled passively (curve referenced 670) or actively (curve referenced 680). Driving the hydraulic exhausting area in time enables to modify hydraulic forces and the dynamic of the shuttle 36 so as to adapt the shape of the acoustic signal as desired. In particular, it can be advantageous to drive the hydraulic exhausting area so as to have the lowest possible rising slope in order to decrease efficiently underwater noise pollution. It is thus possible to control accurately the near Field first peak shape and rising slope as desired, by controlling actively the hydraulic exhaust area.

FIG. 12 is a schematic illustration of an airgun 50 according to a first variant of the first embodiment of the invention. FIGS. 12A, 12B and 12C depict the functioning of the airgun 50 in closed position, in half-open position and open position, respectively.

According to this first variant, the airgun 50 comprises:
 a firing (or pneumatic) chamber 52 containing a compressed air volume,
 two pneumatic exhaust ports 54a and 54b allowing the compressed air volume to be released out of the firing chamber 52,
 a shuttle 56 moveably positioned along a translational axis X,
 hydraulic means intended to brake the shuttle 56, comprising a hydraulic chamber 58 and having a hydraulic exhaust area of a liquid volume 580 out of the hydraulic chamber 58, the hydraulic chamber 58 being isolated from the pneumatic exhaust ports 54a and 54b,
 a hydraulic exhaust port 59 arranged in the middle of the airgun side wall and dedicated to the hydraulic exhausting of the liquid volume 580 out of the hydraulic chamber 58.

The airgun 50 differs from the airgun 30 in that the shuttle 56 has a shape designed for housing at least one part of the liquid volume. The shuttle 56 further comprises a translational arm 53 being through the hydraulic chamber 58, along with the translational axis X, up to the hydraulic exhaust port 59. The translational arm 53 is of T-shaped configuration, the arm end 51 forming a sealing cap for the hydraulic exhaust port 59 in closed position.

The shuttle 56, the translational arm 53 and the hydraulic exhaust port 59 are arranged in a manner that:
 when the shuttle 56 is in the closed position (FIG. 12A), the compressed air volume is enclosed within the firing chamber 52 and the shuttle 56 is outside the hydraulic chamber 58 so that the arm 53 seals the hydraulic exhaust port 59 with one of its ends 51;
 when the shuttle 56 is in the open position (FIG. 12C):
   the compressed air volume is released out of the firing chamber 52 through the pneumatic exhaust ports 54a and 54b (represented by arrows 55), to produce a bubble that generates the acoustic signal in the water, the shuttle 56 is comprised inside the hydraulic chamber 58 so that the arm end 51, which sealed the hydraulic exhaust port 59, is displaced outside of the hydraulic chamber 58, thereby releasing out the liquid volume of the hydraulic chamber 58 through the hydraulic exhaust port 59 (represented by arrows 57).

At FIG. 12B, the shuttle 56 is in half-open position: the shuttle 56 reveals the pneumatic exhaust port 54 and the compressed air volume begins to be released out of the firing chamber 52. In parallel, the shuttle 56 displaces the arm 53 revealing the hydraulic exhaust port 59 and enabling the liquid volume contained in the hydraulic chamber 58 to be released out of the hydraulic chamber 58.

In this exemplary variant, the means for adapting the hydraulic exhaust area are constituted by the hydraulic exhaust port 59 communicating with the hydraulic chamber 58 that does not communicate with the pneumatic exhaust ports 54a and 54b. The hydraulic exhaust port 59 is here independent from the pneumatic exhaust ports 54a and 54b, and is entirely dedicated to the liquid volume exhausting.

In addition, the hydraulic exhaust port 59 has a nozzle shape with a non-constant cross sectional area along the axis X. This particular shape of varying cross sectional area leads to create, by the displacement of the shuttle 56 (and of its end 51) relative to the hydraulic exhaust port walls, a non-linear and non-constant hydraulic exhaust area as a function of the shuttle position, as illustrated in the FIG. 13. The curve representing the hydraulic exhaust area ($A_{hydro}$) is in three sections, each section corresponding to a discontinuity of shape of the hydraulic exhaust port 59. Contrary to the prior art airgun represented in FIG. 14, the hydraulic exhaust area ($A_{hydro}$) is non-linear as a function of the shuttle position. The pneumatic exhaust area ($A_{pneu}$) remains identical.

In general, it should be noted that the hydraulic exhaust area can be adapted as a function of the hydraulic exhaust port shape.

FIG. 15 is a schematic illustration of an airgun 60 according to a second variant of the first embodiment of the invention. FIGS. 15A, 15B and 15C depict the functioning of the airgun 60 in closed position, in half-open position and open position, respectively.

The airgun 60 has a different design from the one of the airgun 30. More particularly, the airgun 60 comprises:
 a firing chamber 62 containing a compressed air volume,
 a shuttle 66 moveably positioned along a translational axis X,
 a return chamber 61 dedicated to return, once the firing phase completed, the shuttle 66 in closed position in order to restart a new firing phase,
 two pneumatic exhaust ports 64a and 64b allowing the compressed air volume to be released out of the firing chamber 62,
 hydraulic means intended to brake the shuttle 66, comprising a hydraulic chamber 68 and having a hydraulic exhaust area of a liquid volume 680 out of the hydraulic chamber 68, the hydraulic chamber 68 being isolated from the pneumatic exhaust ports 64a and 64b,
 two hydraulic exhaust ports 69a and 69b communicating with the hydraulic chamber 68 and allowing the liquid volume 680 to be released out of the hydraulic chamber 68.

In this exemplary variant, the means for adapting the hydraulic exhaust area are constituted by the two hydraulic exhaust ports 69a and 69b communicating with the hydraulic chamber 68 that does not communicate with the pneumatic exhaust ports 64a and 64b. The hydraulic exhaust ports 69a and 69b are here independent from the pneumatic exhaust ports 64a and 64b, and are entirely dedicated to the liquid volume exhausting. For example, these hydraulic exhaust ports 69a and 69b are elbow-shaped through holes of constant cross-section.

The shuttle 66 moves during the opening phase between two extreme positions (following the black arrow):
- a closed position (FIG. 15A) in which the compressed air volume is enclosed within the firing chamber 62,
- an open position (FIG. 15C) in which:
  - the compressed air volume is released out of the firing chamber 62 through the pneumatic exhaust ports 64a and 64b (represented by arrows 65), to produce a bubble that generates an acoustic signal in the surrounding water,
  - the liquid volume is released out of the hydraulic chamber 68 through the hydraulic exhaust ports 69a and 69b (represented by arrows referenced 67).

At FIG. 15B, the shuttle 66 is in half-open position: the shuttle 66 reveals the pneumatic exhaust ports 64a and 64b and the compressed air volume begins to be released out of the firing chamber 62. In parallel, the liquid volume 680 begins to be released out of the hydraulic chamber 68.

The presence of two hydraulic exhaust ports 69a and 69b communicating with the hydraulic chamber 68 that does not communicate with the pneumatic exhaust ports 64a and 64b leads to create a constant hydraulic exhaust area ($A_{hydro}$) as a function of the shuttle position (x) along its translational axis X.

As in the embodiment of FIG. 3, one may envisage to add at the vicinity of each of the hydraulic exhaust ports 69a and 69b a remotely-controlled tune valve (not shown) to adjust actively the liquid volume discharged in the surrounding water. This leads to an active hydraulic control of the output acoustic signal.

FIG. 16 is a schematic illustration of an airgun 70 according to a second embodiment of the invention. FIGS. 16A and 16B depict the functioning of the airgun 70 during its opening phase, respectively, in closed position and in open position.

According to this particular embodiment, the airgun 70 comprises:
- a firing (or pneumatic) chamber 72 containing a compressed air volume,
- two pneumatic exhaust ports 74a and 74b allowing the compressed air volume to be released out of the firing chamber 72,
- a shuttle 76 moveably positioned along a translational axis X,
- hydraulic means intended to brake the shuttle 76, these hydraulic means comprising:
  - a first hydraulic chamber 710 containing a first liquid volume 715, communicating directly with the pneumatic exhaust ports 74a and 74b;
  - a second hydraulic chamber 720 containing a second liquid volume 725, which is isolated from the pneumatic exhaust ports 74a and 74b;
- two hydraulic exhaust port 79a, 79b arranged on the side wall of the airgun 70, allowing the liquid to be released out of the second hydraulic chamber 720.

Here, the hydraulic means have a first hydraulic exhaust area of the liquid volume 715 out of the hydraulic chamber 710 in a classic way via pneumatic exhaust ports 74a and 74b and a second hydraulic exhaust area of the liquid volume 725 out of the hydraulic chamber 720 via the hydraulic exhaust port 79a, 79b.

In this exemplary embodiment, the means for adapting the hydraulic exhaust area are constituted by the two hydraulic exhaust ports 79a and 79b communicating with the second hydraulic chamber 720 that does not communicate neither with the first hydraulic chamber 710 or with the pneumatic exhaust ports 74a and 74b. The hydraulic exhaust ports 79a and 79b are here independent from the pneumatic exhaust ports 74a and 74b, and are entirely dedicated to the liquid volume exhausting. These are through holes of constant cross-section.

The shuttle 76 moves during the opening phase between two extreme positions (following the black arrow):
- a closed position (FIG. 16A) in which the compressed air volume is enclosed within the firing chamber 72,
- an open position (FIG. 16B) in which:
  - the compressed air volume is released out of the firing chamber 72 through the pneumatic exhaust ports 74a and 74b (represented by arrows 75), to produce a bubble that generates an acoustic signal in the surrounding water,
  - the second liquid volume 725 of the second hydraulic chamber 720 is released out through the hydraulic exhaust ports 79a and 79b (represented by arrows 77).
  - the first liquid volume 715 of the first hydraulic chamber 710 is released out, in a classic way, through the pneumatic exhaust ports 74a and 74b (represented by arrows 73).

As in the embodiment of FIG. 3, one may envisage to add at the vicinity of each of the hydraulic exhaust ports 79a and 79b a remotely-controlled tune valve (not shown) to adjust actively the liquid volume discharged in the surrounding water. This leads to an active hydraulic control of the output acoustic signal.

FIG. 17 is a schematic illustration of an airgun 80 according to a third embodiment of the invention. FIGS. 17A and 17B depict the functioning of the airgun 80, respectively, in closed position and in open position.

According to this embodiment, the airgun 80 comprises:
- a firing chamber 82 containing a compressed air volume,
- a return chamber 81,
- a shuttle 86 moveably positioned along a translational axis X and having a non-constant front section,
- two pneumatic exhaust ports 84a and 84b allowing the compressed air volume to be released out of the firing chamber 82,
- hydraulic means intended to brake the shuttle 86, comprising:
  - a first hydraulic chamber 810 containing a first liquid volume 815 and communicating directly with the pneumatic exhaust ports 84a and 84b.
  - a second hydraulic chamber 820 containing a first liquid volume 825 which is isolated from the pneumatic exhaust ports 84a and 84b in closed position, but which communicates with first hydraulic chamber 810 during opening phase, The shuttle 86 moves during the opening phase between two extreme positions (following the black arrow):
- a closed position (FIG. 17A) in which:
  - the compressed air volume is enclosed within the firing chamber 82, and
  - the first liquid volume 815 within the first hydraulic chamber 810 communicating directly with surrounding water through exhaust ports 84,
  - the second liquid volume 825 is enclosed within the second hydraulic chamber 820,
- an open position (FIG. 17B) in which:
  - the compressed air volume is released out of the firing chamber 82 through the pneumatic exhaust ports 84a and 84*b* (arrows 85), to produce a bubble that generates an acoustic signal in the surrounding water, the liquid volume 825 of the second hydraulic chamber 820 is exhausted into the first chamber 810 through an aperture 89 created by the displacement of the shuttle 86 in relation to a partition wall 83 of the second hydraulic chamber 820, the liquid volume 815 is released out of the first hydraulic chamber 810 through the pneumatic exhaust ports 84*a* and 84*b* (arrows referenced 87) into surrounding water.

In this exemplary embodiment, the means for adapting the hydraulic exhaust area are constituted by the secondary hydraulic chamber 820 communicating with the first hydraulic chamber 810 itself communicating with the pneumatic exhaust ports 84*a* and 84*b*. Contrary to the embodiment previously presented, there is no hydraulic exhaust port dedicated to the liquid volume exhausting, the liquid volume being exhausted out of the airgun 80 by the pneumatic exhaust ports 84*a* and 84*b*. The displacement of the shuttle 86 during the opening phase creates an aperture 89 of non-constant front section, which allows to obtain a non-linear hydraulic exhaust area as a function of the shuttle position (x) along its translational axis.

FIG. 18 is a schematic illustration of an airgun 90 according to first variant of the third embodiment of the invention. FIGS. 18A and 18B depict the functioning of the airgun 90, respectively, in closed position and in open position.

The airgun 90 has a different design from the one of the airgun 80. In that variant, the airgun 90 comprises:
a firing chamber 92 containing a compressed air volume,
a shuttle 96 moveably positioned along a translational axis X,
two pneumatic exhaust ports 94*a* and 94*b* allowing the compressed air volume to be released out of the firing chamber 92,
hydraulic means intended to brake the shuttle 96, comprising:
 a first hydraulic chamber 910 containing a first liquid volume 915 and communicating directly with the pneumatic exhaust ports 94*a* and 94*b*,
 a second hydraulic chamber 920 containing a second liquid volume 925 which communicates with first hydraulic chamber 910 via a through hole 99 formed within a partition wall 91 separating the first 910 and second 920 hydraulic chambers.

The shuttle 96 moves during the opening phase between two extreme positions (following the black arrow):
a closed position (FIG. 18A) in which:
 the compressed air volume is enclosed within the firing chamber 92, and
 the first liquid volume 915 is enclosed within the first hydraulic chamber 910,
 the second liquid volume 925 is enclosed within the second hydraulic chamber 920,
an open position (FIG. 18B) in which:
 the compressed air volume is released out of the firing chamber 92 through the exhaust ports 94*a* and 94*b*, to produce a bubble that generates an acoustic signal in the surrounding water,
 the second liquid volume 925 of the second chamber 920 is exhausted, in a constant way, through the opening 99, into the first hydraulic chamber 910,
 the first liquid volume 915 of the first hydraulic chamber 910 is released out through the pneumatic exhaust ports 94*a* and 94*b* (represented by arrows referenced 97) into surrounding water.

In this exemplary variant, the means for adapting the hydraulic exhaust area are constituted by the secondary hydraulic chamber 920 communicating with the first hydraulic chamber 910 itself communicating with the pneumatic exhaust ports 94*a* and 94*b*. There is no hydraulic exhaust port dedicated to the liquid volume exhausting, the liquid volume being exhausted out of the airgun 90 by the pneumatic exhaust ports 94*a* and 94*b*. The displacement of the shuttle 96 during the opening phase displaces the second liquid volume from the second to the first hydraulic chamber. The hydraulic exhaust area thus obtained is constant as a function of the shuttle position (x) along its translational axis, over the opening phase.

FIG. 19 is a schematic illustration of an airgun 100 according to second variant of the second embodiment of the invention. FIGS. 19A, 19B and 19C depict the functioning of the airgun 100, respectively, in closed position, in half-open position and in open position.

According to this variant, the airgun 100 comprises:
a firing chamber 102 containing a compressed air volume,
a shuttle 106 moveably positioned along a translational axis X, comprising a T-shaped shuttle head 103,
two pneumatic exhaust ports 104*a* and 104*b* allowing the compressed air volume to be released out of the firing chamber 102,
hydraulic means intended to brake the shuttle 106, comprising:
 a first hydraulic chamber 1010 containing a first liquid volume 1015 and communicating directly with the pneumatic exhaust ports 104*a* and 104*b*,
 a second hydraulic chamber 1020 containing a first liquid volume 1025 which communicates with first hydraulic chamber 1010 via a through hole 109 formed within the T-shaped shuttle head 103.

The shuttle 106 moves during the opening phase between two extreme positions (following the black arrow):
a closed position (FIG. 19A) in which:
 the compressed air volume is enclosed within the firing chamber 102, and
 the first liquid volume 1015 is enclosed within the first hydraulic chamber 1010,
 the second liquid volume 1025 is enclosed within the second hydraulic chamber 1020,
an open position (FIG. 19C) in which:
 the compressed air volume is released out of the firing chamber 102 through the exhaust ports 104*a* and 104*b*, to produce a bubble that generates an acoustic signal in the surrounding water,
 the second liquid volume 1025 of the second chamber 1020 is exhausted, in a constant way, through the hole 109, into the first chamber 1010,
 the first liquid volume 1015 of the first chamber 1010 is released out, through the pneumatic exhaust ports 104*a* and 104*b* (represented by arrows referenced 107) into surrounding water.

The means for adapting the hydraulic exhaust area are constituted by the secondary hydraulic chamber 1020 communicating with the first hydraulic chamber 1010 itself communicating with the pneumatic exhaust ports 104*a* and 104*b*. The liquid volume is exhausted out of the airgun 100 by the pneumatic exhaust ports 104*a* and 104*b*. The displacement of the shuttle 106 during the opening phase displaces the second liquid volume from the second to the first hydraulic chamber via the holes 109 comprised in the shuttle head 103. The hydraulic exhaust area thus obtained is constant as a function of the shuttle position (x) along its translational axis, over the opening phase.

FIG. 20 is a schematic illustration of an airgun 200 according to a fourth embodiment of the invention. FIGS. 20A, 20B and 20C depict the functioning of the airgun 200, respectively, in closed position, in half-open position and in open position.

According to this particular embodiment, the airgun 200 comprises:
- a firing chamber 202 containing a compressed air volume,
- a shuttle 206 moveably positioned along a translational axis X, comprising a bell-shaped shuttle head 203,
- two pneumatic exhaust ports 204a and 204b allowing the compressed air volume to be released out of the firing chamber 202,
- hydraulic means intended to brake the shuttle 206, comprising a hydraulic chamber 208 and having a hydraulic exhaust area of a liquid volume 280 out of the hydraulic chamber 208.

The airgun 200 differs from the airgun 30 in that the shuttle 206 has a bell-shaped shuttle head 203 designed for housing at least one part of the liquid volume 280. The bell-shaped shuttle head 203 comprises through holes 209a and 209b communicating, on the one hand, with the hydraulic chamber 208 and, on the other hand, with the pneumatic exhaust ports 204a and 204b.

The shuttle 206 moves during the opening phase between two extreme positions (following the black arrow):
- a closed position (FIG. 20A) in which the compressed air volume is enclosed within the firing chamber 202,
- an open position (FIG. 20C) in which:
  - the compressed air volume is released out of the firing chamber 202 through the pneumatic exhaust ports 204a and 204b (represented by arrows 205), to produce a bubble that generates an acoustic signal in the surrounding water,
  - the liquid volume 280 is released out of the hydraulic chamber 208 through the holes 209a and 209b, then through the pneumatic exhaust ports 204a and 204b respectively (represented by arrows 207).

At FIG. 20B, the shuttle 206 is in half-open position: the shuttle 206 reveals the pneumatic exhaust ports 204a and 204b and the compressed air volume begins to be released out of the firing chamber 202 (arrows 205). In parallel, the liquid volume 280 contained in the hydraulic chamber 208 begins to be released out of the hydraulic chamber 208 via the through holes comprised in the shuttle head 203 (arrows 207).

In this exemplary embodiment, the means for adapting the hydraulic exhaust area are constituted by the shuttle head 203 with through holes 209a and 209b, the hydraulic chamber 208 communicating with the through holes themselves communicating with the pneumatic exhaust port 204a and 204b. Those means leads to create a constant hydraulic exhaust area ($A_{hydro}$) as a function of the shuttle position (x) along its translational axis X.

In particular, the different embodiments here above described in relation with FIGS. 3, 12, 15 to 20 depict airguns comprising one hydraulic chamber (FIG. 3, 12, 15, 20) or two hydraulic chambers (16 to 19). The number of hydraulic chambers is limited purely for the purposes of pedagogical description, and so as not to burden the figure and the associated description. Of course, a greater number of hydraulic chambers is possible, for example in order to even more refine control of the output acoustic signal. The same applies to the number of hydraulic exhaust ports.

Thus, as illustrated in FIGS. 16 to 19, one of the features of an embodiment of the invention is based on a change of the hydraulic forces by adding one or more hydraulic chambers that interacts with the shuttle.

As a general rule, the forces exerted within an airgun, like the prior art airgun 10, during the opening phase can be defined as follow:

$$\Sigma \vec{F} = m_{shuttle} * \vec{a}_{shuttle} = \Sigma \vec{F}_{pneumatic} + \Sigma \vec{F}_{hydraulic} + \Sigma \vec{F}_{friction}$$

with:

$m_{shuttle}$ is the movable shuttle mass, $\vec{a}_{shuttle}$ is the movable shuttle acceleration, $\Sigma \vec{F}_{pneumatic}$ represents sum of the pneumatic forces generated by the pneumatic chamber and applied on the shuttle, $\Sigma \vec{F}_{hydraulic}$ represents sum of the hydraulic forces generated by the hydraulic chamber applied on the shuttle, $\Sigma \vec{F}_{friction}$ represents sum of the mechanical friction forces exerted on the shuttle or between the fluids (gas and liquid) and the shuttle.

The pneumatic forces and hydraulic forces applied on the shuttle depend on the pneumatic and hydraulic volumes and shuttle sections on which these volumes are in contact. In other words, the pneumatic forces and hydraulic forces applied on the shuttle depend on the gun geometry.

The hydraulic force is function of:
- the front area of the shuttle, which is constant,
- the pressure of the hydraulic chamber, which depends on its volume and the hydraulic exhaust area $A_{hyd}(x)$ as a function of the shuttle position (x) along its translational axis X, during the opening phase.

For prior art airgun, the hydraulic exhaust area $A_{hyd}$ is the complement of the pneumatic exhaust area ($A_{pneu}$) compared to the total area ($A_{total} = A_{pneu} + A_{hyd}$) as the pneumatic exhaust ports also play the role of hydraulic exhaust ports (pneumatic and hydraulic exhaust ports are basically combined). The pneumatic exhaust area ($A_{pneu}$) is related to the exhaust port geometry (length and width of each exhaust port) and shuttle position. For a basic rectangular port, the pneumatic exhaust area $A_{pneu}$ and the hydraulic exhaust area $A_{hyd}$ can be defined as follow:

$$A_{pneu} = x * \text{Width}$$

$$A_{hyd} = (\text{Length} - x) * \text{Width}$$

Hydraulic force is result of a unique volume ($V_{hyd1}$) with its pressure ($p_{hyd1}$) applied on the constant front section of the shuttle ($S_{hyd1}$).

$$\Sigma \vec{F}_{hydraulic} = F_{hyd1} = p_{hyd1} * S_{hyd1}$$

Therefore, according to an embodiment of the invention, sum of the hydraulic forces is changed by addition of one or more hydraulic chambers that interacts with the shuttle. By this way, the sum of the hydraulic forces becomes:

$$\sum \vec{F}_{hydraulic} = \sum_{i=1}^{n} F_{hyd\_i} = \sum_{i=1}^{n} (p_{hyd\_i} * S_{hyd\_i})$$

where:
n is the total number of hydraulic chambers comprised within the airgun.

FIG. 21 is a schematic illustration of a shuttle 210 that can be integrated into an airgun consistent with a fifth embodiment of the invention.

In this exemplary embodiment, the means for adapting the hydraulic exhaust area according to the invention are formed by a shuttle head 220 having a non-constant cross-sectional shape along the translational axis X of the airgun. The other structural features of the airgun remain identical to those of the prior art airgun 10. The principle here is to adapt the shuttle head shape to have a non-linear hydraulic exhaust area of the hydraulic volume out of the hydraulic chamber as a function of the shuttle position (x) along its translational axis during opening phase, and thereby to tune hydraulically the output acoustic signal.

As shown in FIGS. 22A (prior art airgun) and 22B (airgun according to the fifth embodiment of the invention FIG. 21), such a front shuttle shape according to an embodiment of the invention leads to have a different covering surface of the pneumatic exhaust ports on the hydraulic volume side only, without changing the pneumatic structural features. The pneumatic exhaust area for prior art airgun and for airgun according to an embodiment of the invention remains the same.

Here, the shuttle head 220 has a crown-shaped structure whose centre merges with the shuttle axis X. More generally, the shuttle head can have any non-constant cross-sectional shape along the translational axis X that assures a non-linear hydraulic exhaust area of the hydraulic volume out of the airgun.

An example of profile of hydraulic exhaust area thus obtained with the means of an embodiment of the invention is illustrated in FIG. 23. Curve 232 exhibits the pneumatic exhaust area ($A_{pneu}$), curve 231 exhibits the hydraulic exhaust area ($A_{hydro}$) for the prior art airgun 10 and curve 230 exhibits the hydraulic exhaust area ($A_{hydro}$) the airgun according to the fifth embodiment of the invention FIG. 21, as a function of the position of the shuttle of the airgun. The hydraulic exhaust area obtained for an embodiment of the invention has non-linear profile as a function of the shuttle position because of the particular shape of the shuttle head 220.

An exemplary embodiment of the disclosure provides an airgun whose output acoustic signal is controlled with an increased efficiency.

An exemplary embodiment provides an airgun that has a greater capacity of modulation of acoustic signal than the prior art airgun.

An exemplary embodiment provides an airgun that offers the ability of driving in a dynamic way the output acoustic signal.

An exemplary embodiment provides an airgun that offers an increased near field spectral band.

An exemplary embodiment provides an airgun that reduces efficiently underwater noise pollution.

Although the present disclosure has been described with reference to one or more examples, workers skilled in the art will recognize that changes may be made in form and detail without departing from the scope of the disclosure and/or the appended claims.

One may also envisage other alternatives for hydraulically controlling the output signal by a combination of the embodiments and/or variants described above without departing from the scope of the invention.

The invention claimed is:

1. A device for producing an acoustic signal in a liquid medium, comprising:
   a pneumatic chamber configured to contain a compressed gas volume,
   at least one pneumatic exhaust port allowing the compressed gas volume to be released out of the pneumatic chamber,
   a shuttle, which is movable along a translational axis during an opening phase, between two positions:
   a closed position in which the compressed gas volume is enclosed within the pneumatic chamber,
   an open position in which the compressed gas volume is released out of the pneumatic chamber through said at least one pneumatic exhaust port and out of the device, to produce the acoustic signal in the liquid medium,
   a hydraulic brake configured to brake the shuttle during said opening phase, said hydraulic brake comprising a hydraulic chamber and having a hydraulic exhaust area of a hydraulic volume out of the hydraulic chamber, said hydraulic exhaust area being configured to enable the hydraulic volume to be exhausted out of said device in said liquid medium over the opening phase;
   wherein said hydraulic brake comprises an acoustic signal control configured to control the gas volume that exhausts from the device so as to control the acoustic signal.

2. The device according to claim 1, wherein said acoustic signal control comprises means for adapting said hydraulic exhaust area.

3. The device according to claim 1, wherein said acoustic signal control comprises at least one hydraulic exhaust port which is not confounded with said at least one pneumatic exhaust port.

4. The device according to claim 3, wherein said at least one hydraulic exhaust port communicates with said hydraulic chamber that does not communicate with said at least one pneumatic exhaust port.

5. The device according to claim 3, wherein said at least one hydraulic exhaust port communicates with at least one secondary hydraulic chamber that does not communicate with said hydraulic chamber nor with said at least one pneumatic exhaust port.

6. The device according to claim 3, wherein said acoustic signal control comprises means for driving the hydraulic volume releasing out of said at least one hydraulic exhaust port, during said opening phase.

7. The device according to claim 6, wherein said means for driving the hydraulic volume comprise a tune valve.

8. The device according to claim 3, wherein said at least one hydraulic exhaust port and the shuttle are arranged for forming a constant hydraulic exhaust area as a function of the shuttle position along its translational axis, during said opening phase.

9. The device according to claim 3, wherein said at least one hydraulic exhaust port and the shuttle are arranged for forming a non-constant and non-linear hydraulic exhaust area as a function of the shuttle position along its translational axis, during said opening phase.

10. The device according to claim 1, wherein said acoustic signal control comprises at least one secondary hydraulic chamber communicating with said hydraulic chamber itself communicating with said at least one pneumatic exhaust port.

11. The device according to claim 10, wherein said at least one secondary hydraulic chamber communicates with said hydraulic chamber via a through aperture created by the displacement of the shuttle in relation to at least one partition wall of said at least one hydraulic chamber.

12. The device according to claim 10, wherein said at least one secondary hydraulic chamber communicates with said hydraulic chamber via at least one through hole arranged within a shuttle head.

13. The device according to claim 10, wherein said at least one secondary hydraulic chamber communicates with said hydraulic chamber via at least one through hole arranged within a partition wall separating said least one secondary hydraulic chamber.

14. The device according to claim 1, wherein said acoustic signal control comprises a shuttle head comprising at least one through aperture, said hydraulic chamber communicating with said at least one through aperture itself communicating with said at least one pneumatic exhaust port.

15. The device according to claim 1, wherein said acoustic signal control comprise a shuttle head having a non-constant cross-sectional shape along the translational axis.

16. The device according to claim 15, wherein said shuttle head belongs to the group consisting of: a crow-shaped shuttle head; a conical-shaped shuttle head; an ovoid-shaped shuttle head; a bell-shaped shuttle head.

17. A method comprising: controlling an acoustic signal produced in a liquid medium by a device comprising:
  a pneumatic chamber to contain a compressed gas volume,
  at least one pneumatic exhaust port allowing the compressed gas volume to be released out of the pneumatic chamber,
  a shuttle, which is movable along a translational axis during an opening phase, between two positions:
  a closed position in which the compressed gas volume is enclosed within the pneumatic chamber,
  an open position in which the compressed gas volume is released out of the pneumatic chamber through said at least one pneumatic exhaust port and out of the device, to produce the acoustic signal in the liquid medium,
  a hydraulic brake configured to brake the shuttle during said opening phase, said hydraulic brake comprising a hydraulic chamber and having a hydraulic exhaust area of a hydraulic volume out of the hydraulic chamber, said hydraulic exhaust area being configured to enable the hydraulic volume to be exhausted out of said device in said liquid medium over the opening phase; and
  controlling the acoustic signal with an acoustic signal control of said hydraulic brake configured to control the gas volume that exhausts from the device.

18. The method according to claim 17, wherein controlling the acoustic signal with said hydraulic brake driving the hydraulic volume releasing out of at least one hydraulic exhaust port, which is not confounded with said at least one pneumatic exhaust port, during said opening phase.

* * * * *